(12) United States Patent
Block et al.

(10) Patent No.: US 6,377,938 B1
(45) Date of Patent: *Apr. 23, 2002

(54) REAL TIME SUBSCRIBER BILLING SYSTEM AND METHOD

(75) Inventors: Robert S. Block, Los Angeles, CA (US); Richard J. Riccoboni, New Suffick; Alexander A. Wenger, Melville, both of NY (US); Frederick H. Chapus, Los Angeles, CA (US); Jonathan R. Bramwell, San Diego, CA (US); J. Roger Daugherty, Los Angeles, CA (US)

(73) Assignee: Real-Time Billing, Inc., Reno, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,387

(22) Filed: Feb. 27, 1997

(51) Int. Cl.[7] .............................................. G06F 17/60
(52) U.S. Cl. ................... 705/32; 379/114.03
(58) Field of Search ............................. 379/114, 144, 379/114.03; 455/405, 406, 407; 705/32

(56) References Cited

U.S. PATENT DOCUMENTS

| | | |
|---|---|---|
| 2,533,677 A | 12/1950 | McCreary .................. 379/121 |
| 3,184,538 A | 5/1965 | Court ......................... 380/227 |
| 3,531,586 A | 9/1970 | Bass et al. .................. 725/151 |
| 4,122,308 A | 10/1978 | Weinberger et al. ........ 379/131 |
| 4,192,972 A | 3/1980 | Bertoglio et al. |
| 4,198,545 A | 4/1980 | Haist et al. ................. 379/132 |
| 4,225,884 A | 9/1980 | Block et al. |
| 4,484,217 A | 11/1984 | Block et al. .................. 725/1 |
| 4,486,773 A | 12/1984 | Okubo |

(List continued on next page.)

FOREIGN PATENT DOCUMENTS

EP          526118 A2 *   2/1993   .......... H04M/17/02

OTHER PUBLICATIONS

Cotton et al., "Real–time billing systems", Cellular Business, vol. 12, No. 2, pp. 168, Feb. 1995.*

Booty, Frank, "More than a reminder", Communications International, vol. 21, No. 10, pp. 89, Oct. 1994.*

*Primary Examiner*—Tariq R. Hafiz
*Assistant Examiner*—Alexander Kalinowski
(74) *Attorney, Agent, or Firm*—Burns, Doane, Swecker & Mathis, LLP

(57) ABSTRACT

A system and method are provided for real time subscriber billing in a standard network routing path. Account information is stored for at least one subscriber. A determination is made, based on the account information, whether the subscriber has a sufficient balance for a desired service. Service is authorized or denied to the subscriber based on the determination.

34 Claims, 31 Drawing Sheets

U.S. PATENT DOCUMENTS

| | | | |
|---|---|---|---|
| 4,528,589 A | 7/1985 | Block et al. | |
| 4,706,275 A | 11/1987 | Kamil | |
| 4,710,955 A * | 12/1987 | Kauffman | 380/10 |
| 4,776,000 A * | 10/1988 | Parienti | 455/407 |
| 4,868,873 A | 9/1989 | Kamil | |
| 4,879,744 A * | 11/1989 | Tasaki et al. | 379/144 |
| 4,893,248 A | 1/1990 | Pitts et al. | 705/400 |
| 4,943,707 A | 7/1990 | Boggan | 235/380 |
| 4,975,942 A * | 12/1990 | Zebryk | 379/144 |
| 5,103,475 A * | 4/1992 | Shuen | 379/112 |
| 5,109,401 A * | 4/1992 | Hattori et al. | 455/407 |
| 5,138,650 A * | 8/1992 | Stahl et al. | 455/408 |
| 5,144,649 A | 9/1992 | Zicker et al. | |
| 5,220,593 A | 6/1993 | Zicker et al. | |
| 5,265,155 A * | 11/1993 | Castro | 379/112 |
| 5,291,543 A | 3/1994 | Freese et al. | |
| 5,301,223 A * | 4/1994 | Amadon et al. | 455/409 |
| 5,325,418 A * | 6/1994 | McGregor et al. | 455/408 |
| 5,384,831 A | 1/1995 | Creswell et al. | |
| 5,517,555 A | 5/1996 | Amadon et al. | |
| 5,559,871 A * | 9/1996 | Smith | 379/115 |
| 5,577,100 A * | 11/1996 | McGregor et al. | 455/406 |
| 5,625,669 A * | 4/1997 | McGregor et al. | 455/418 |
| 5,634,012 A | 5/1997 | Stefik et al. | 705/39 |
| 5,664,006 A * | 9/1997 | Monte et al. | 455/405 |
| 5,706,330 A * | 1/1998 | Bufferd et al. | 455/405 |
| 5,717,604 A * | 2/1998 | Wiggins | 395/200.59 |
| 5,799,072 A | 8/1998 | Vulcan et al. | 379/114 |
| 5,802,502 A | 9/1998 | Gell et al. | 705/37 |
| 5,852,812 A | 12/1998 | Reeder | 705/39 |
| 5,867,566 A | 2/1999 | Hogan et al. | 379/115 |
| 5,960,416 A | 9/1999 | Block | 705/39 |

\* cited by examiner

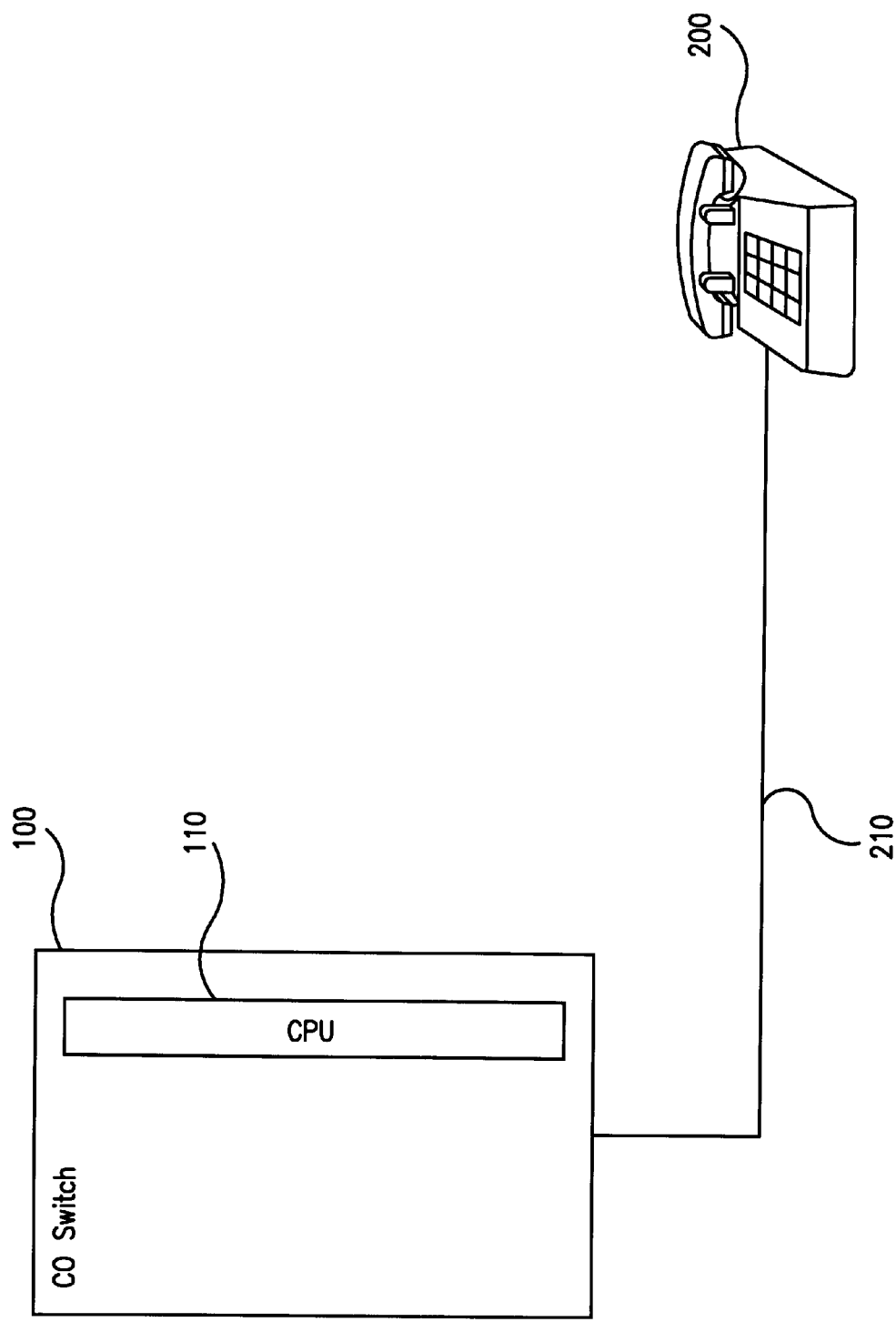

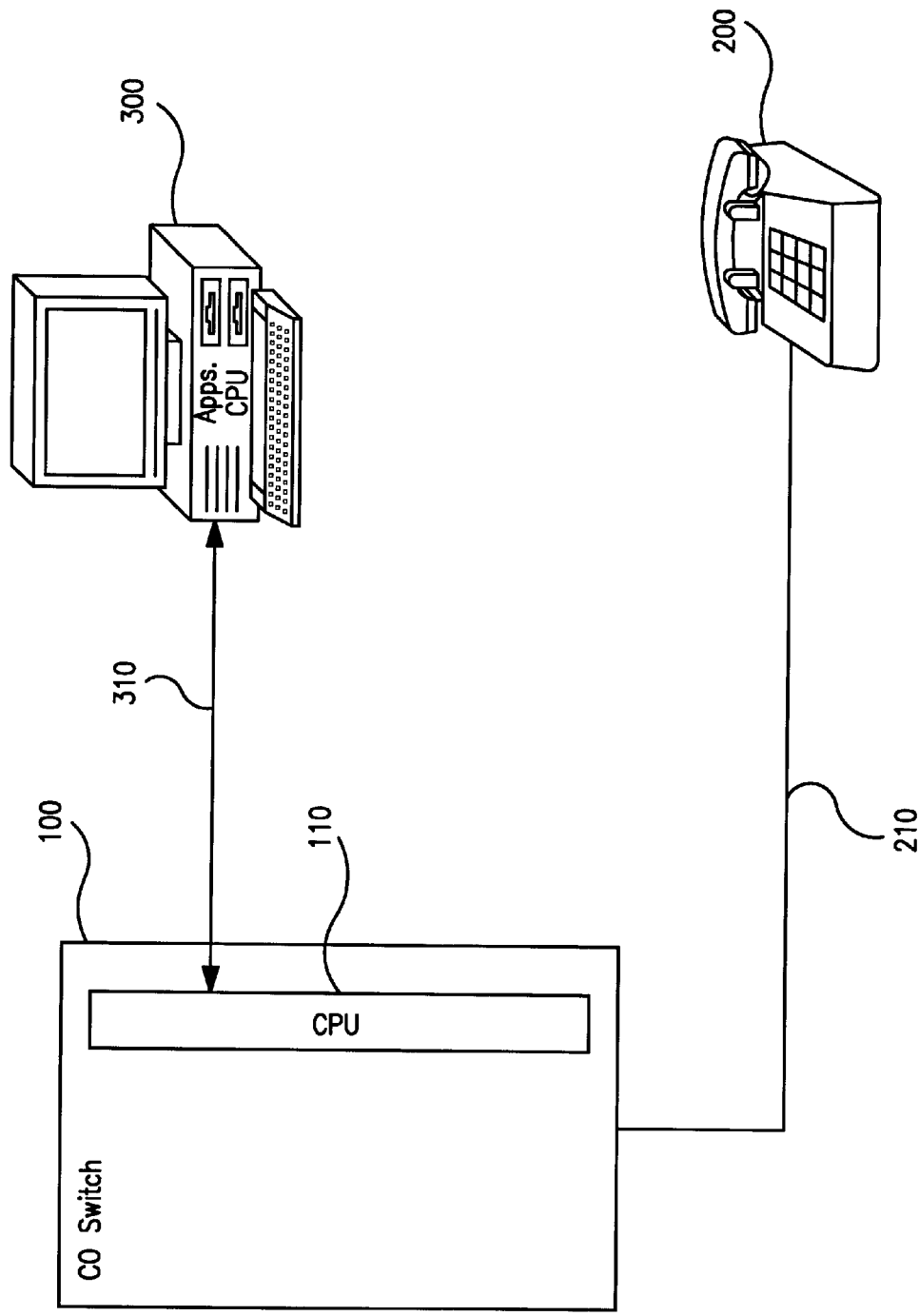

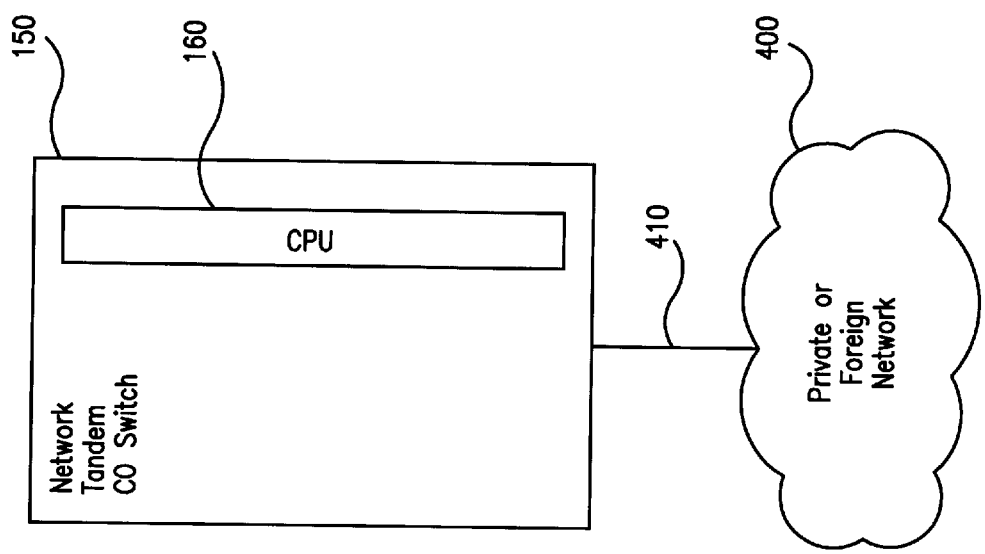

REAL TIME SUBSCRIBER BILLING SYSTEM AND METHOD

BACKGROUND

The present invention relates to a system and method for real time subscriber billing. More particularly, the present invention relates to a system and method for real time subscriber billing in a standard network routing path.

There are a variety of methods for billing subscribers for services such as telephone, pay-per-view TV, Internet, water, gas, and so on. The most common method is to bill subscribers monthly for such services. When bills are based on usage, billing is usually performed after the service is used. Usage information is collected by a billing system, the amount to be billed is calculated based on the usage information, and bills are printed and sent to the subscribers once a month.

The usage information is typically collected by storing a Detail Use Record (DUR) in a temporary memory location in the equipment which monitors subscriber usage. In a telephone system, the DUR Memory is often located at an end office switch to which a subscriber line is directly attached. In an Internet environment, the DUR Memory is typically located at the server location or at the service provider. In a pay-per-view TV system, the DUR Memory is typically located at the subscriber location.

The DUR includes all the information needed to calculate the charges for a particular communication session. For example, in a telephone billing system, the DUR is referred to as the Call Detail Record (CDR). The CDR typically includes the telephone number of the subscriber placing the call, the telephone number called, the time of the call, and the duration of the call. In a pay-per-view TV system, the DUR typically includes the identification number of the subscriber ordering a program and the program identification number for the program ordered. On a regular basis, depending on the size of the DUR Memory and the activity, the DUR is retrieved from the DUR Memory by the billing system. The billing system then applies a billing algorithm against the DUR to calculate the subscriber's charges for usage. Additional charges for equipment rental, flat monthly service charges, taxes, and so on, are calculated by the billing system and added to the usage charges. The total bill is then printed as an invoice and mailed to the subscriber.

Only upon receipt of the printed invoice does the subscriber discover the charges accumulated. This often presents a problem for the subscriber when it comes time to pay the bill, since the charges may be greater than anticipated. If a subscriber fails to pay the bill on time, a service provider may try and contact the subscriber and attempt to get the bill paid. If the bill is not paid, the service provider eventually disconnects the service. This procedure often takes months, and bills often accumulate to the point where the subscriber cannot afford to keep the services.

Another common billing method is multi-metering. This method, which is commonly employed in telephone systems, uses multi-metering pulses to calculate charges based on usage. According to this method, pulses representing the cost of usage are generated at regular intervals during a telephone call. The value of each multi-metering pulse is the same, but the timing of the generation of the pulses varies with the cost of the particular call. For example, if the pulses each represent $0.10, and the charge for a local call is $0.10 for three minutes, a pulse is generated every three minutes. If the charge for a domestic long distance call is $1.00 a minute, a pulse representing $0.10 is generated every six seconds. If the charge for an international long distance call is $4.00 a minute, a pulse representing $0.10 is generated every 1.5 seconds. The pulses are detected, counted, and used to calculate use based charges. An example of a multi-metering pulse detector is provided in U.S. Pat. No. 4,868,873 to Kamil.

For business and private phones, multi-metering pulses are typically transmitted to the telephone inaudibly and displayed to the caller on a display unit attached to the telephone. This permits the caller to determine the charge accumulation as the call progresses.

When multi-metering pulses are used in public telephones, a caller typically deposits money in the telephone, and the total value deposited is displayed in a display unit attached to the phone. Alternately, the caller can insert a smart card or a memory card with a prepaid balance into a reader on the telephone or dial a number indicated on the card, and the balance on the card is displayed in the display unit. As the call progresses, the balance displayed is decremented by the charge for each pulse. For example, if a customer deposits $1.00 in a telephone and places a local call which costs $1.00 for every three minutes, and pulses representing $0.10 are generated every three minutes, the balance displayed is decremented by $0.10 every three minutes. In this example, the customer can talk for thirty minutes before the pulses zero the deposit.

Another type of billing method is a prepaid telephone service, an example of which is disclosed in U.S. Pat. No. 4,706,275 to Kamil. According to this method, a subscriber sends a service provider a payment or authorizes that a prepaid amount be charged to his or her credit card. This prepaid amount is credited to the subscriber's account with the service provider. To access the service, the subscriber dials the number of the service provider or a special exchange and keys in an identifying code, such as a Personal Identification Number (PIN). The subscriber's account is checked, and if it is in good standing, the subscriber is provided with a dial tone to place a long distance call as well as the account balance. The billing system decrements the subscriber's balance as the call progresses.

Another billing method is proposed by U.S. Pat. No. 4,484,217 to Block. This patent discloses a method for pay-per-view television billing in which credit information is stored at the subscriber location. The subscriber is permitted access to television program transmissions depending on a comparison of the stored credit information and cost signals that are contained in the transmission.

A problem with all of these billing methods is that the calculation of the bill occurs at a remote location outside the standard network routing path of the subscriber. That is, usage information must be sent to an entity such as a service provider or a special exchange outside the standard network routing path of the subscriber. The service provider or special exchange calculates the bill, then returns the billing charges to the subscriber. This sending of billing information to and from an entity outside the standard network routing path of the subscriber can be both time-consuming and expensive.

Thus, there is a need for a real time subscriber billing system in which charges for a desired service can be calculated in the standard network routing path of the subscriber.

SUMMARY

It is an object of the present invention to provide a real time subscriber billing system that calculates charges for a desired service within the standard network routing path of the subscriber.

It is another object of the present invention to provide a real time subscriber billing system that authorizes service based on a subscriber's usable balance.

It is yet another object of the present invention to simplify and, to the extent possible, eliminate the delivery of hard copy customer invoices to a subscriber except when desired by the subscriber.

It is yet another object of the present invention to simplify subscriber payment procedures and provide a subscriber with information concerning his or her usable balance at any time.

It is yet another object of the present invention to offer subscribers the ability to pay for other products or services purchased or billed through his or her account.

It is yet another object of the invention to provide a subscriber with control over who is authorized to charge services or products to his or her account.

According to the present invention, these and other objects are met by a system and method for real time subscriber billing in a standard network routing path. Account information is stored for at least one subscriber. A determination is made whether the subscriber has a sufficient balance for a desired service based on the stored account information. Service is authorized or denied to the subscriber based on his determination.

BRIEF DESCRIPTION OF THE DRAWINGS

The foregoing and other objects, features, and advantages of the present invention will be more readily understood upon reading the following detailed description in conjunction with the drawings in which:

FIGS. 2a–2d illustrate a central office switch for real time subscriber billing according to a first embodiment of the present invention;

FIGS. 4a–4d illustrate a network for real time subscriber billing according to a third embodiment of the present invention;

DETAILED DESCRIPTION

For ease of discussion, the following embodiments will be described with reference to a telephone network. One skilled in the art will appreciate, however, that the present invention is not limited to a telephone network but is applicable to any type of subscriber system.

Figure 1A:
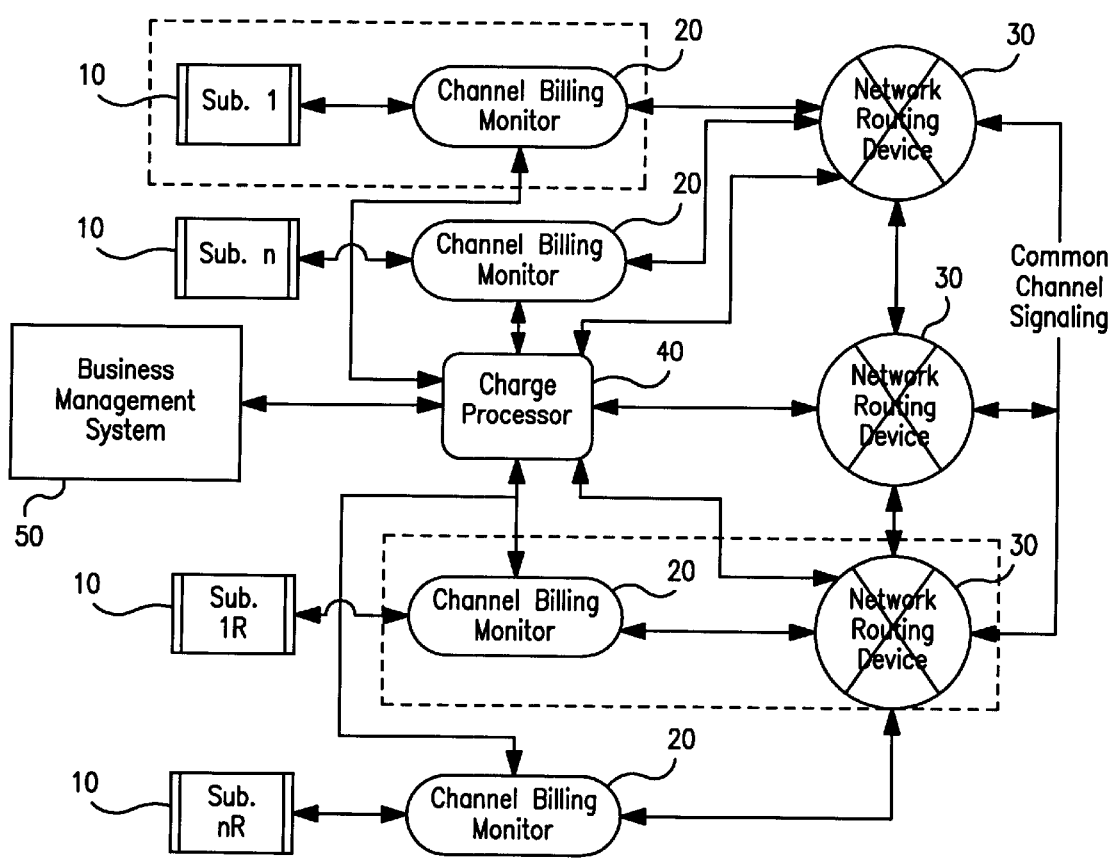
FIG. 1a illustrates an exemplary system for real time subscriber billing according to one embodiment of the present invention.

FIG. 1a illustrates an exemplary system for real time subscriber billing according to the present invention. In FIG. 1a, there are four subscribers, Sub. 1, Sub. n., Sub. 1R, and Sub. nr, identified with the reference numeral 10. The subscribers 10 can, for example, be standard telephone network subscribers. Subscribers Sub. 1 and Sub. n represent subscribers initiating calls, and subscribers Sub. 1R and Sub. nR represent subscribers receiving calls. Although four subscribers are shown, one skilled in the art will appreciate that the real time billing system according to the present invention can be applicable to any number of subscribers.

Channel Billing Monitors 20 and Network Routing Devices 30 are arranged in a standard network routing path of the subscribers 10. That is, the Channel Billing Monitors 20 and the Network Routing Devices 30 are arranged within the path connecting the initiating subscribers, Sub. 1 and Sub. n, to the receiving subscribers, Sub. 1R and Sub nR. As shown by the dashed lines in FIG. 1a, the Channel Billing Monitors 20 can be located at the subscriber locations or at the Network Routing Devices 30. Alternately, the Channel Billing Monitors 20 can be arranged separately at any place along the standard network routing path, between the initiating subscribers and the receiving subscribers.

The Channel Billing Monitors 20 detect cost signals representing predetermined charge amounts generated during a call or the elapsed time during a call. The cost signals can be generated by the Network Routing Devices 30 or the Charge Processor 40. The Channel Billing Monitors can be implemented with, for example, a device such as that shown in FIG. 1b which can detect and count cost signals.

Figure 1B:
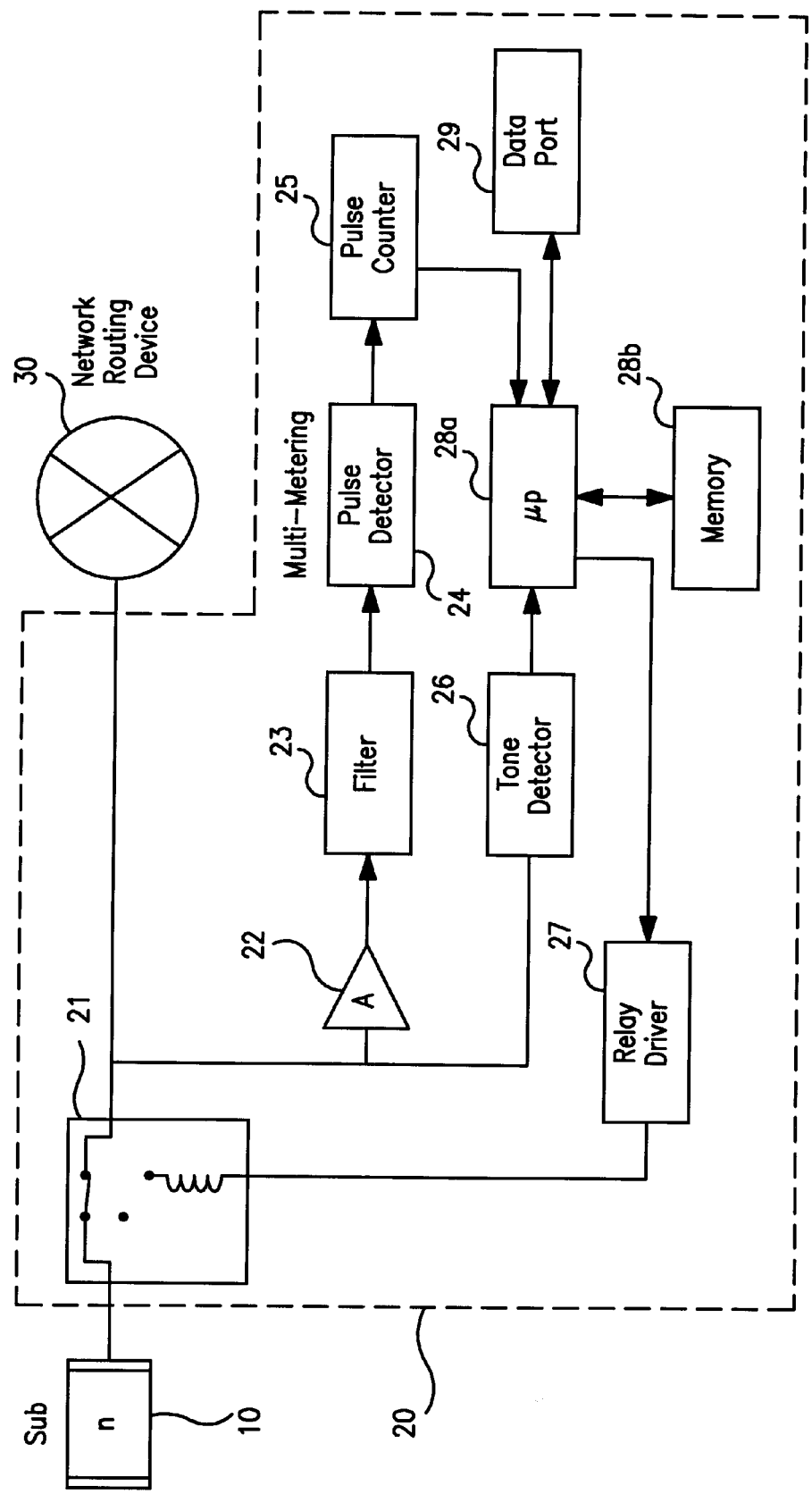
FIG. 1b illustrates an exemplary Channel Billing Monitor according to one embodiment of the present invention.

Referring to FIG. 1b, the Channel Billing Monitor 20 is connected to Sub. n and a Network Routing Device 30. The Channel Billing Monitor 20 includes an amplifier 22 for amplifying the signal from Sub. n, a Filter 23 for filtering the signal, a Pulse Detector 24 for detecting the cost signal, and a Pulse Counter 25 for counting the detected cost signals. The count of the cost signals is delivered to a Microprocessor 28a and compared with subscriber account information stored in a Memory 28b to determine what service to provide the subscriber. The Microprocessor 28a communicates with the Processor 60 (shown in FIG. 1c) via the Data Port 29 to update the subscriber account information.

The Channel Billing Monitor 20 also includes a relay switch 21 driven by a relay driver 27 as instructed by the Microprocessor 28a. For example, if the subscriber does not have an adequate usable balance, the Microprocessor 28a instructs the relay driver 27 to open the switch 21 to disconnect Sub. n. For certain calls such as emergency calls or calls to the service provider, the Microprocessor 28a can instruct the relay driver 27 to close the switch 21 and connect Sub. n.

The Channel Billing Monitor also includes a Tone Detector 26 for detecting, for example, touch tones dialed by Sub. n and delivering these tones to the Microprocessor 28a.

The Network Routing Devices 30 route calls from the initiating subscribers to the receiving subscribers. The Network Routing Devices 30 can be implemented with, for example, central office switches, end office switches, or tandem switches, depending on the placement of the Network Routing Devices 30 in the network routing path. Specific examples of Network Routing Devices are described with reference to FIGS. 2a,c, 3a,c, 4a,c, 5a,c and 6a,e.

As shown in FIG. 1a, Common Channel Signalling (CCS) can be employed between the Network Routing Devices 30. This permits data to be sent and received during a call without affecting the voice path.

Real time billing processing can occur at any of the Channel Billing Monitors 20, the Network Routing Devices 30, or at the subscriber locations. For real time billing processing occurring in a Channel Billing Monitor 20, the number of cost signals generated or the time elapsed is detected, counted, and compared with stored subscriber account information to determine what service to provide the subscriber. For real time billing processing occurring at a Network Routing Device 30 or at a subscriber location, the number of cost signals generated or the time elapsed is detected by the Channel Billing Monitor at the network Routing Device 30 or at the subscriber location. The number of cost signals or the elapsed time is then counted and compared with stored subscriber account information to determine what service to provide the subscriber.

Real time billing processing at the subscriber location can occur at either the initiating subscriber's end, the receiving subscriber's end, or both. For example, if calls are to be charged to the initiating subscriber, the real time billing processing can occur at the initiating subscriber's end. If the calls are to be charged to the receiving subscriber, e.g., for collect calls, the real time billing processing can occur at the receiving subscriber's end. There can also be instances in which charges for calls can be shared between the initiating subscribers and the receiving subscribers, in which case real time billing processing occurs at each of the subscribers participating in the call.

Real time billing processing can also be performed in a Charge Processor 40. This can be desirable, for example, if real time billing is to be implemented in existing standard network equipment that does not have real time billing capabilities. For real time billing processing occurring in the Charge Processor 40, the number of cost signals generated or the elapsed time is detected by a Channel Billing Monitor 20 and delivered to the Charge Processor 40. The Charge Processor 40 counts the number of cost signals generated or the elapsed time and, based on a comparison of the counted number of cost signals or elapsed time with stored subscriber account information, determines what service to provide. The subscriber account information can be stored in the Charge Processor 40, or at the subscriber location, the Channel Billing Monitor 20, or the Network Routing Device 30. The Charge Processor 40 can be implemented with, for example, a microprocessor.

Stored subscriber account information can be updated periodically or at any time by the Business Management System 50 which manages subscriber payments. Depending on where subscriber account information is stored and where real time billing processing occurs, call charges and subscriber account information can be forwarded from a Channel Billing Monitor 20, a Network Routing Device 30, a subscriber location, or the Charge Processor 40 to the Business Management System 50 on a regular basis or upon completion of each call. The Business Management System 50 reconciles payments made by the subscriber with the call charges and forwards this information to the Channel Billing Monitor 20, the Network Routing Device 30, the subscriber location, or the Charge Processor 40 which updates the subscriber's account, accordingly.

Depending on where the real time billing processing is performed, all the elements shown in FIG. 1a are not necessary. For example, if real time billing processing occurs in the Channel Billing Monitor 20, the Network Routing Device 30, or at a subscriber location, the Charge Processor 40 is not necessary. Also, Channel Billing Monitors 20 are only necessary at those places where cost signals or elapsed time are detected, e.g., at the subscriber location, the Network Routing Devices 30, or at a point in the network routing path in between. There need not be Channel Billing Monitors at all of these locations. FIG. 1a merely shows Channel Billing Monitors at various different locations for ease of illustration.

Figure 1C:
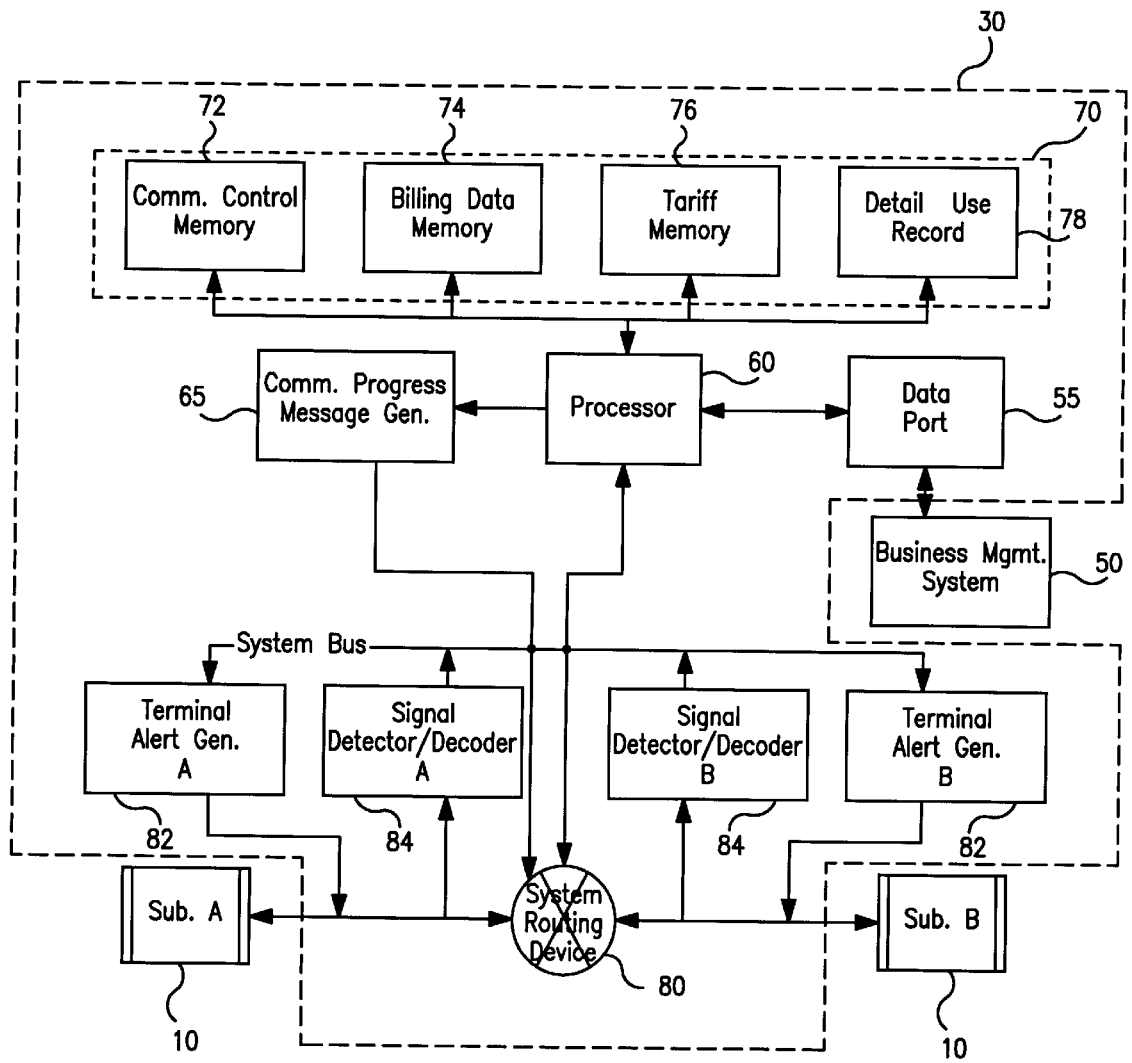
FIG. 1c illustrates in detail an exemplary Network Routing Device for real time subscriber billing according to one embodiment of the present invention.

FIG. 1c illustrates in detail an exemplary network routing device for performing real time subscriber billing according to the present invention. As indicated by the dashed lines in FIG. 1c, the Network Routing Device 30 is connected between subscribers Sub. A and Sub. B, both referenced by reference numeral 10. The Network Routing Device 30 is also connected to the external Billing Management System 50. For ease of illustration, the Network Routing Device 30 shown in FIG. 1c performs all the real time billing processing, without requiring connection to the Charge Processor 40 shown in FIG. 1a.

Referring to FIG. 1c, the Network Routing Device 30 includes a Processor 60 which performs real time billing calculations. The Processor 60 can be implemented with, for example, a microprocessor.

The Network Routing Device 30 also includes a memory 70 for storing information relating to the subscriber and services. The memory 70 can be subdivided into four submemories: the Communications Control Memory 72, the Billing Data Memory 74, the Tariff Memory 76, and the Detail Use Record Memory 78. The Communications Control Memory 72 stores information regarding the status of the subscribers, including, for example, whether a subscriber is on hook or off hook, as well as the telephone number called and other information. The Billing Data Memory 74 stores information regarding the subscriber's usable balance. The Tariff Memory 76 stores information relating to the charges for various types of services, i.e., the tariff, as wells as taxes and flat rate charges. The Detailed Use Record Memory 78 stores detailed information regarding call charges. Although shown as four submemories for ease of illustration, these submemories can be incorporated into fewer or divided between more memories.

According to one aspect of the present invention, the Processor 60 determines what service to provide the subscriber based on a comparison of a count of cost signals and the subscriber's usable balance. While a call charged to a subscriber is in progress, cost signals, e.g., timed pulses, are generated at regular time intervals. The cost signals can be generated, for example, by the Processor 60. Each cost signal represents a predetermined charge amount. The time between pulses, referred to as the pulse rate, can be determined by the destination of the call or, in the case of a collect call, by the origin of the call, as well as other characteristics of the call, such as bandwidth. The rates can, for example, be established by a tariff which can be changed periodically by downloading tariff information from, for example, a central office switch into the Tariff Memory 76.

The pulses are detected by the Channel Billing Monitor (not shown), and the Processor 60 counts the number of pulses generated from the origination of a call to the end of the call. For example, the Processor 60 deducts the beginning pulse number from the ending pulse number or adds the number of pulses generated. The counting can, for security purposes, be continuous from the first call, the pulse number never being reset to zero. This avoids the opportunity for fraudulently resetting the subscriber's account to zero before it is actually used up. Alternately, the number of pulses count can be reset by deducting the number of pulses paid for from the total number of pulses used.

The subscriber's usable balance can be represented by a Pulse Use Limit (PUL) and a Pulse Use Credit (PUC) stored in the Billing Data Memory 74. The PUL and the PUC are expressed as a number of pulses, the PUL representing a deposit paid by a subscriber, and the PUC representing a credit limit established for the subscriber. The Processor 60 can be programmed to continuously compare the number of pulses generated with the PUL or the PUC or to decrement the PUL or the PUC by one pulse for every pulse generated during a call.

Instead of using pulses of a predetermined value to establish the use limit or the credit limit, local currency values can be used to establish these limits. For example, a Subscriber Use Limit (SUL) and a Subscriber Credit Limit (SCL) can be stored in the Billing Data Memory 74 for each subscriber. The SUL and the SCL are similar to the PUL and the PUC, respectively, except that the SUL and the SCL are expressed in local currency instead of a number of pulses. The SUL and SCL can be decremented in the same manner as the PUL or the PUC for every pulse generated during a call.

The amount of the PUC/SCL may exceed the amount of the PUL/SUL. Thus, if the subscriber has an authorized PUC/SCL, the subscriber may be authorized to exceed the PUL/SUL by the amount of the PUC/SCL.

When the use equals the PUL/SUL or the PUC/SCL, the Class of Service (COS) provided to the subscriber can be altered. The COS can be automatically altered according, for example, to a predetermined service provider policy for each subscriber or subscriber class. That is, the COS can be changed in accordance with a predetermined service provider policy. For example, when the pulses used equals the PUL/SUL or the PUC/SUC, the Processor 60 can prevent any incoming or outgoing calls of any kind, permit incoming calls and inhibit outgoing calls, or permit outgoing local calls but inhibit incoming calls and outgoing long distance calls.

Alternately, the COS can be altered when the difference between the use and the PUL/SUL or PUC/SUC reaches a predetermined amount. The COS can also be linked to special promotions or discounts offered to specific subscribers or classes of subscribers. This can include discounts for volume use or the use of multiple services, etc. For example, when usage reaches a certain level during a given period, discounts can be applied to the subscriber billing rates.

According to another aspect of the invention, instead of detecting and counting cost signals as a basis for determining what service to provide a subscriber, the Processor 60 can count the elapsed time during a call and determine the COS to provide the subscriber on this basis.

The Processor 60 calculates call charges in real time during a call, applying the duration of the call to the appropriate section of the tariff stored in the Tariff Memory 76. The call charges are then stored as a DUR in the DUR Memory 78. For a telephone call, the call charges are stored as a CDR which includes the called number, the call duration, the call charges, and any such other information as may be desired by the subscriber or the service provider.

The Business Management System 50 can notify the Processor 60 of payments made by the subscriber via the Data Port 55. The Processor 60 updates the subscriber's account with the payment amount. The Processor 60 also updates the subscriber's account with flat charges, e.g., monthly equipment rental fees, and subtracts these charges from the subscriber's balance. If the subscriber has not submitted a payment in a predetermined amount of time, the Business Management System 50 can instruct the Processor 60 to disable the subscriber's service.

The Network Routing Device 30 also includes a System Routing Device 80 for routing calls between subscribers Sub. A and Sub. B, Terminal Alert Generators 82 for generating ring signals to alert a receiving subscriber to go off-hook, and Signal Detector/Decoders 84 for detecting when an initiating subscriber has gone off-hook as well as the number called and providing this information to the Processor 60. For example, when a call to Sub. B is initiated by Sub. A, this is detected by the Signal Detector/Decoder A which also detects the telephone number called. The Signal Detector/Decoder A delivers this information, including the subscriber number, the called number, the billing rate, and the start time of the call to the Processor 60. The Processor 60 determines what service to provide the subscriber and calculates the connect time available to the subscriber based on the value of the subscriber's usable balance stored, for example, in the Billing Data Memory 74.

For a call to be charged to Sub. A, Sub. A's balance is checked. If the Processor 60 determines that Sub. A has a sufficient usable balance to make the call to Sub. B, the Processor 60 instructs the Communication Progress Message Generator 65 to generate an appropriate message, such as a dial tone or an error message. This message is transmitted to Sub. A via the System Routing Device 80.

The Processor 60 also instructs the Terminal Alert Generator B to generate a ring signal which is transmitted to Sub. B. The status of the Terminal Alert Generator can be stored, for example, in the Communications Control Memory 72. The call is then routed by the System Routing Device 80 from Sub. A to Sub. B.

As the call progresses, the Processor 60 decrements the subscriber's balance at the appropriate intervals, depending on the tariff stored in the Tariff Memory 76. For example, the first three minutes can be one charge and each subsequent minute or portion thereof an additional charge.

The Processor 60 is notified of the time of call termination by the Signal Detector/Decoder 84. Depending on whether the call termination occurs before or after Sub. A's balance is reached, one of the following procedures is followed. If the Processor 60 is notified that the call is terminated before the Sub. A's usable balance is reached, the Processor 60 calculates the charges for the call and deducts the calculated charges from the remaining balance. If Sub. A's usable balance is reached before the Processor 60 is notified that the call has ended, the Processor 60 issues the instruction to terminate the call.

There are various ways in which a subscriber can be informed of charges. For example, as the deposit or remaining credit limit is decremented during a call, the subscriber can be notified of the remaining balance through audible tones or a digital voice signal. A series of tones representing specific balances, e.g., a $10 balance remaining, a $5 balance, a $2 balance, or one minute remaining, can be transmitted to the subscriber. A digital voice signal can also be used to announce the value of the subscriber's remaining balance or time remaining before the call is cut off.

Alternately or in addition to the warning tones or voice, a button can be provided on the telephone keypad which the subscriber can push to display on an attached display unit the amount of time remaining, the value of the subscriber's balance, or the amount of charges accumulated to date. The attached display unit can be implemented with, for example, an LCD, LED, CRT, Plasma display, or other visual display attached to the telephone.

Another way in which the subscriber can be informed of the charges accumulated to date or the remaining balance is by pressing a predetermined sequence of buttons on the telephone keypad, including identifying information such as a PIN. The subscriber can then connected to a Voice Response System (VRS). In response to digital voice prompts from the VRS, the subscriber identifies the information desired. The VRS can provide the value of the subscriber's balance or a list of call charges, depending on the subscriber's request.

The subscriber can also be informed of the charges accumulated to date by facsimile on demand. The subscriber dials a predetermined sequence of numbers on the telephone keypad, including identifying information such as a PIN. If dialing from a facsimile machine, the subscriber simply presses start, and the list of chargeable calls since the last billing is retrieved from the DUR memory 78 and forwarded to the subscriber's facsimile machine. If the subscriber has called from a telephone instead of a facsimile machine, he or she is prompted to input the facsimile number which the bill is to be delivered to. The subscriber is provided with a facsimile bill within a time period determined by the Processor 60. For example, if the Processor 60 allows, the facsimile bill can be sent while the subscriber is on the line. If not, the facsimile bill can be sent one hour or twenty four hours later, depending on the capacity of the system. The subscriber can be notified by the VRS of the approximate time that the facsimile bill will be sent.

The subscriber can choose to have the billed calls sorted in the facsimile bill. For example, a subscriber can enter a two digit number which is then used as a sort code. The two digit number can be entered after a special tone at the end of the dialing sequence or by pressing a predetermined key, such as *, and then the two digit code.

The subscriber can also be informed of charges by invoice printed, for example, by the Business Management System 50. The printed invoices can serve as written confirmation and can be mailed to the subscriber on a regular basis or upon the request of the subscriber.

In FIG. 1c, real time billing processing occurs in a Network Routing Device 30. According to a first embodiment of the present invention, the Network Routing Device can be implemented with a central office switch to which the subscriber is attached. FIG. 2a illustrates a central office (CO) switch 100 in which real time subscriber billing can be performed according to the first embodiment. In FIG. 2a, the CO switch 100 is connected to a subscriber 200 via a subscriber line 210. The CO switch 100 provides the subscriber 200 with telephone service. Although only one subscriber is shown in FIG. 2a, any number of subscribers can be connected to the CO switch 100. In FIG. 2a, real time billing processing can be performed in the central processing unit (CPU) 110 included in the CO switch 100.

Figure 2B:
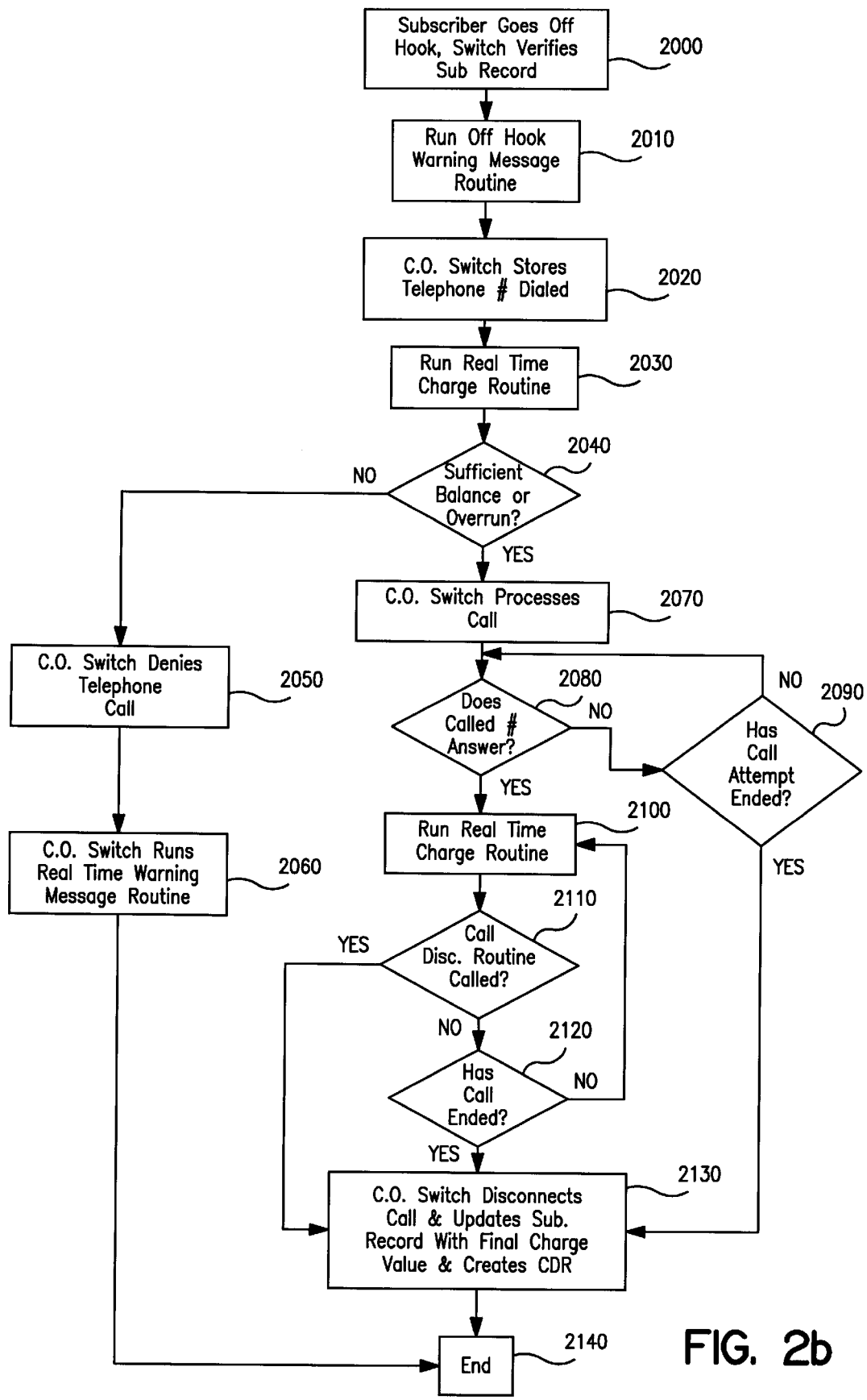

FIG. 2b is a flowchart illustrating an exemplary real time billing process performed by the CO switch shown in FIG. 2a. As shown in FIG. 2b, the process begins at step 2000 at which a subscriber with a prepaid deposit or credit limit goes off hook, and the CO switch 100 verifies the subscriber's record which includes the subscriber's telephone number, the COS, the subscriber's usable balance, etc.

Next, at step 2010, the CO switch 100 runs a Communications Warning Message Routine (CWMR), described with reference to FIG. 7, to issue an off hook warning message to the subscriber. At step 2020, the CO switch 100 stores the telephone number dialed by the subscriber in, for example, the Communications Control Memory 72.

At step 2030, the CO switch 100 runs a Real Time Charge Routine (RTCR), described with reference to FIG. 8. At step 2040, a determination is made whether the subscriber has a sufficient usable balance or is approved an overrun based on the RTCR. If not, the process proceeds to step 2050 at which the CO switch 100 denies the telephone call. From step 2050, the process proceeds to step 2060 at which the CO switch 100 performs the Real Time Warning Message Routine (RTWMR), described with reference to FIG. 9, and issues a warning to the subscriber. If the subscriber hangs up, the RTWMR ends. Otherwise, the RTWMR continues until the end of message. The process then ends at step 2140.

If, at step 2040, it is determined that the subscriber has a sufficient usable balance or overrun is approved, the process proceeds to step 2070 at which the CO switch 100 processes the call. At step 2080, the CO switch 100 determines if the called number answers. If not, the process proceeds to step 2090, at which a determination is made whether the call attempt has ended, e.g., because the calling subscriber has gone off hook.

If, at step 2080, the CO switch 100 determines that the called number has answered, the CO switch runs the RTCR again immediately at step 2100 so that all charges can be applied in real time. At step 2110, a determination is made whether a call disconnect routine has been invoked because, based on the RTCR, the subscriber does not have a sufficient balance or an approved overrun to go forward with the call. If the call disconnect routine is not invoked, the process proceeds to step 2120.

At step 2120, the CO switch 100 determines whether the call has ended, e.g., because either end has hung up. If the call has not ended, the process returns to step 2100. If, at step 2110, the call disconnect routine has been invoked, at step 2120 it is determined that the call has ended, or at step 2090 it is determined that the call attempt has ended, the process proceeds to step 2130.

At step 2130, the CO switch 100 disconnects the call, updates the subscriber record with the final charge value for the call, and creates the final CDR for the call. The process then proceeds to step 2140, where it ends.

In FIG. 2a, real time billing processing occurs in the CPU 110 which performs the real time billing calculations and includes the RTCR and the subscriber account balances. Alternately, real time billing processing can be performed in an Application Central Processor Unit (Apps.CPU) 300 connected to the CO switch 100 via a switch interface 310 as shown in FIG. 2c. In this case, the RTCR and the subscriber account balances are stored in the Apps.CPU 300.

Figure 2D:
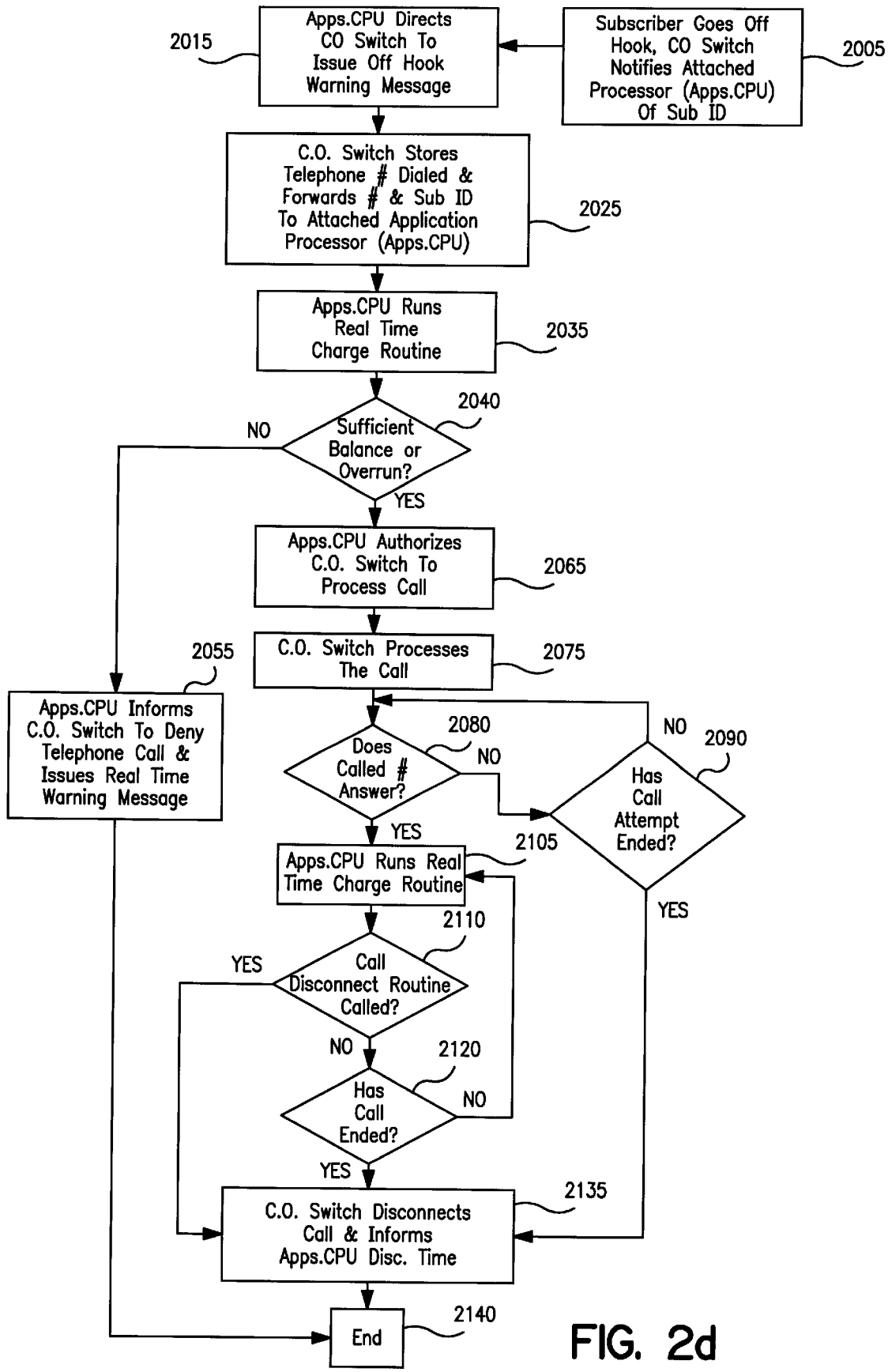

FIG. 2d shows an exemplary real time billing process performed in the CO switch configuration illustrated in FIG. 2c. The flowchart in FIG. 2d is similar to that in FIG. 2b. In FIG. 2d, the process begins at step 2005 at which the subscriber goes off hook, and the CO switch 100 notifies the Apps.CPU 300 of the subscriber ID, i.e., the subscriber's telephone number.

Next, at step 2015, the Apps.CPU 300 directs the CO switch 100 to start the CWMR to issue an off hook warning message. At step 2025, the CO switch 100 stores the telephone number dialed and forwards the number along with the subscriber ID again to the Apps.CPU 300. At step 2035, the Apps.CPU runs the RTCR for the subscriber ID. At step 2040, a determination is made whether the subscriber has a sufficient usable balance or is approved an overrun for the call, based on the RTCR. If not, the process proceeds to step 2055 at which the Apps.CPU 300 instructs the CO switch to deny the call and start the RTWMR. The CO switch 100 denies the call to the subscriber, and the process proceeds to step 2140, where it ends.

If, at step 2040, it is determined that the subscriber has a sufficient usable balance or is approved an overrun, the process proceeds to step 2065 at which the Apps.CPU 300 authorizes the CO switch 100 to process the call. At step 2075, the CO switch 100 processes the call and informs the Apps.CPU 300 of the answer status.

At step 2080, the CO switch 100 determines whether the called number answers. If the called number does not answer, the process proceeds to step 2090 at which it is determined whether the call attempt has ended. If the call attempt has not ended, the process returns to step 2080.

If, at step 2080, the CO switch 100 determines that the called number has answered, the process proceeds to step 2105 at which the CO switch informs the Apps.CPU 300 of the call answer, and the Apps.CPU runs the RTCR again immediately so that all charges can be applied in real time. Next, at step 2110, it is determined, based on the RTCR, whether the call disconnect routine has been invoked. If the call disconnect routine has not been invoked, the process proceeds to step 2120 at which the CO switch 100 determines whether the call has ended. If the call has not ended, the process returns to step 2105.

If, at step 2110 the call disconnect routine has been invoked, or at step 2120, the CO switch 100 determines that the call has ended, or at step 2090 it is determined that the call attempt has ended, the process proceeds to step 2135. At step 2135, the CO switch 100 disconnects the call and informs the Apps.CPU 300 of the disconnect time so that the Apps.CPU can update the subscriber record of the final charge value and create the final CDR for the call. From step 2135, the process proceeds to step 2140, at which it ends.

In the embodiment above, real time billing processing occurs in the central office switch or in a processing unit attached to the central office switch that provides telephone service to the subscriber. Real time billing processing can also occur in a switch that is not connected directly to the subscriber line or trunk. This may be desirable, for example, in networks where CO switches are not capable of real time billing processing. In such a case, according to a second embodiment of the present invention, the real time billing processing can be performed in a tandem CO switch which is connected to an end office switch that provides the subscriber with telephone service.

Figure 3A:
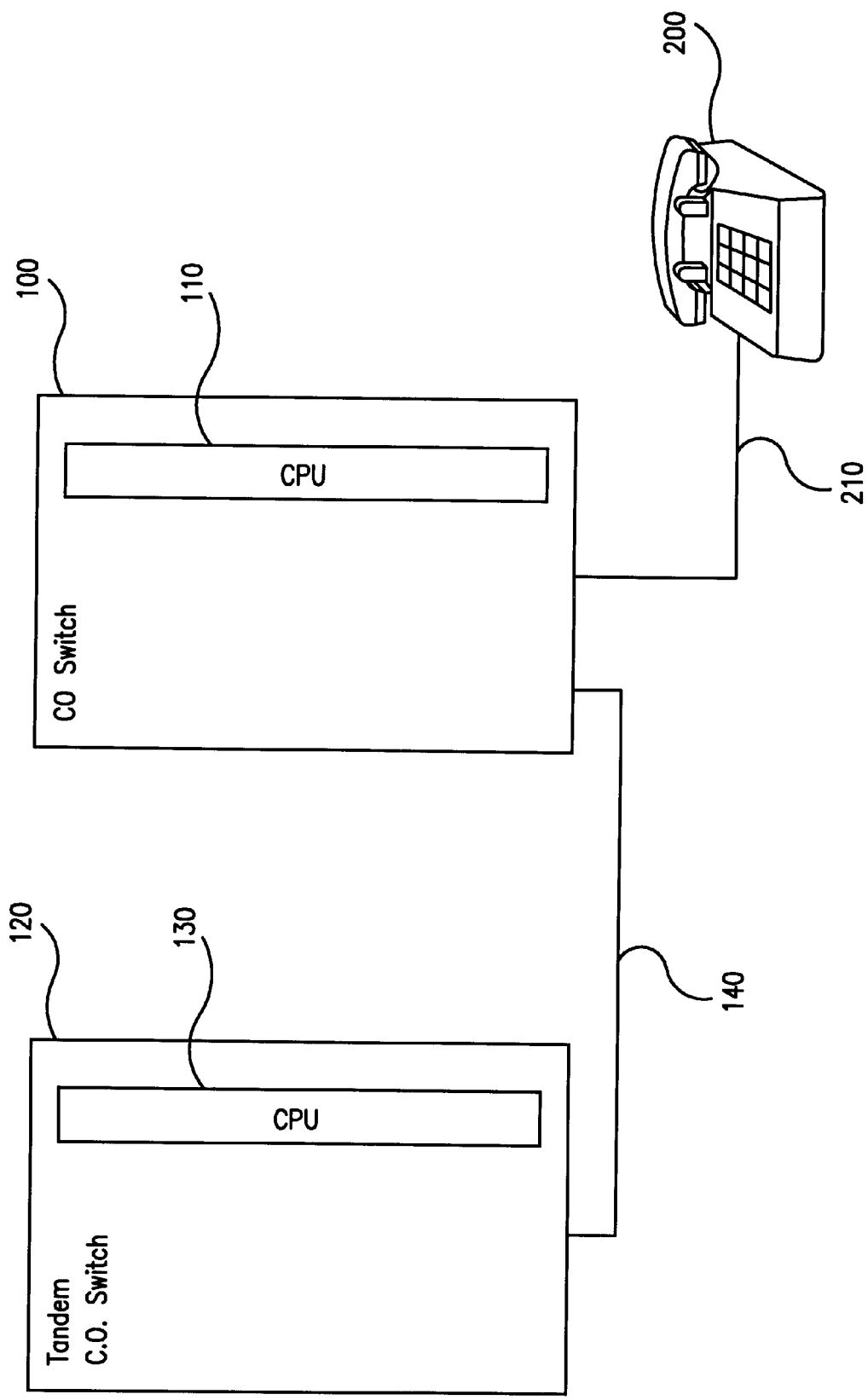
FIGS. 3a–3d illustrate a central office tandem switch for real time subscriber billing according to a second embodiment of the present invention.

FIG. 3*a* illustrates a tandem central office switch in which real time billing system processing can be performed according to the second embodiment of the present invention. In FIG. 3*a*, the tandem CO switch 120 is connected to an end office CO switch 105 which provides a subscriber 200 with telephone service. The real time billing processing can be performed in a CPU 130 included in the tandem CO switch 120. The tandem CO switch 120 is connected to the end office CO switch 105 via standard central office trunks 140. This connection between the tandem CO switch 120 and the end office CO switch 105 can incorporate any method of signaling that provides standard interoffice call handling information such as call setup, call tear down, calling and called number identification, etc. The information transport protocol between CO switches, including end office switches and tandem switches, can be any standard switch protocol, including but not limited to, SS-7, R-2, R-1.5, or R-1.

The subscriber 200 is referred to as a virtual subscriber. Virtual subscribers are handled in much the same way as directly connected subscribers, except that to determine the calling party, the tandem CO switch 120 interrogates the incoming network trunk 140 on which the call is forwarded by the end office switch CO 105. Upon determining the calling party, the tandem CO switch 120 handles the process in the much the same way as described above. COS limitations do not include local calls which are switched between two subscribers on the end office switch.

Figure 3B:
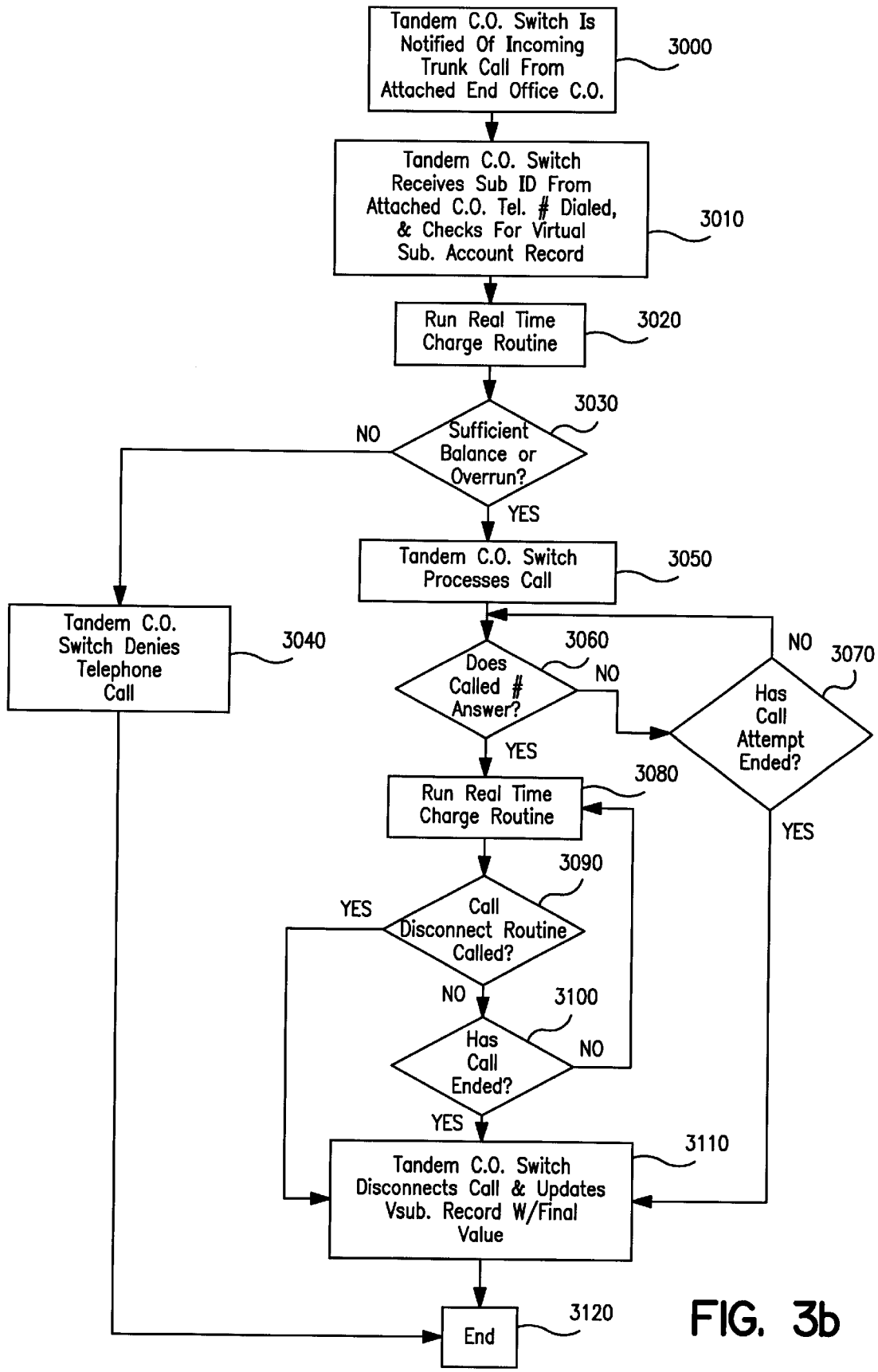

FIG. 3*b* is a flowchart illustrating an exemplary real time billing process performed by the tandem central office switch shown in FIG. 3*a*. Referring to FIG. 3*b*, the process begins at step 3000 at which the tandem CO switch 120 is notified of an incoming interoffice trunk call from the end office CO switch 105. At step 3010, the tandem CO switch 120 receives the telephone number dialed from the end office CO switch 105, requests and receives the calling subscriber number, and checks for a Virtual Subscriber Record (VSUB) for the calling subscriber. The VSUB contains information concerning the subscriber 200 such as account balances, credit information, class of service, record of calls, etc. The VSUB can be stored, for example, in the Billing Data Memory 74 in the tandem CO switch 120.

At step 3020, the tandem CO switch 120 performs the RTCR for the VSUB. At step 3030, the tandem CO switch 120 determines whether there is a sufficient balance or an approved overrun for the VSUB, based on the RTCR. If not, the tandem CO switch 120 denies the call at step 3040. From there, the process proceeds to step 3120, at which it ends.

If, at step 3030, it is determined that there is a sufficient balance or an approved overrun, the process proceeds to step 3050. At step 3050, the tandem CO switch 120 processes the call. At step 3060, the tandem CO switch 120 determines whether the called number answers. If the called number does not answer, the process proceeds to step 3070 at which the tandem CO switch 120 determines whether the call attempt has ended. If the call attempt has not ended, the process returns to step 3060.

If, at step 3060, the tandem CO switch 120 determines that the called number has answered, the process proceeds to step 3080 at which the RTCR is run again immediately so that all charges can be applied in real time. At step 3090, a determination is made whether the call disconnect routine has been invoked because, based on the RTCR, the VSUB does not have approval to proceed with the call. If the call disconnect routine has not been invoked, the process proceeds to step 3100. At step 3100, the tandem CO switch 120 determines whether the call has ended. If the call has not ended, the process returns to step 3080.

From a determination at step 3090 that the call disconnect routine has been invoked, a determination at step 3100 that the call has ended, or a determination at step 3070 that the call attempt has ended, the process proceeds to step 3110. At step 3110, the tandem CO switch 120 disconnects the call, updates the VSUB record with the final charge value, and creates the final CDR for the call. From step 3110, the process proceeds to step 3120, at which it ends.

Figure 3C:
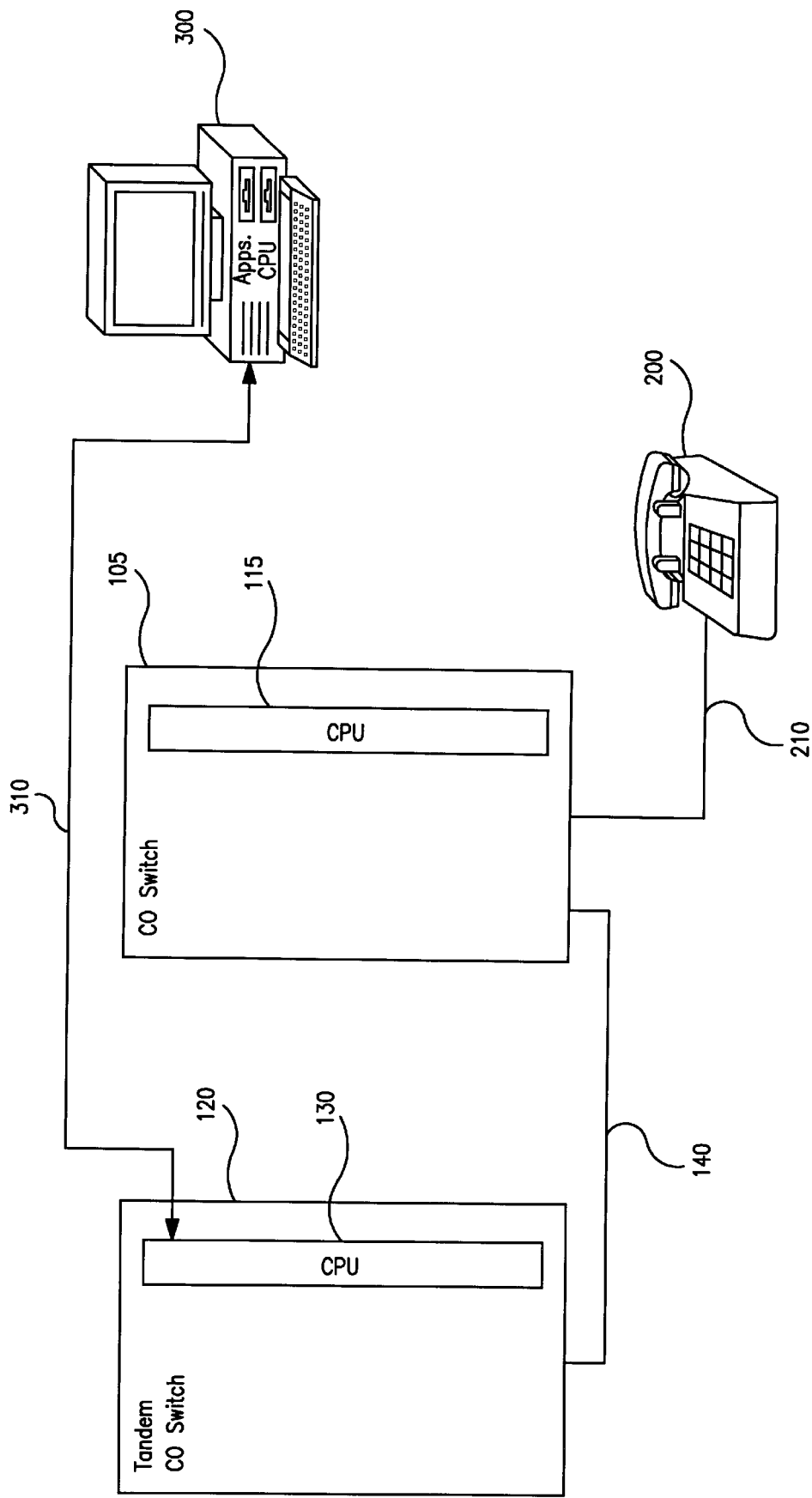

In FIG. 3*a*, real time billing processing occurs in the CPU 130 which performs the real time billing calculations and includes the RTCR and the subscriber account balances. Alternately, real time billing processing can be performed in the Apps.CPU 300 connected to the tandem CO switch 120 via a switch interface 310 as shown in FIG. 3*c*. In this case, the RTCR and the subscriber account balances are stored in the Apps.CPU 300.

Figure 3D:
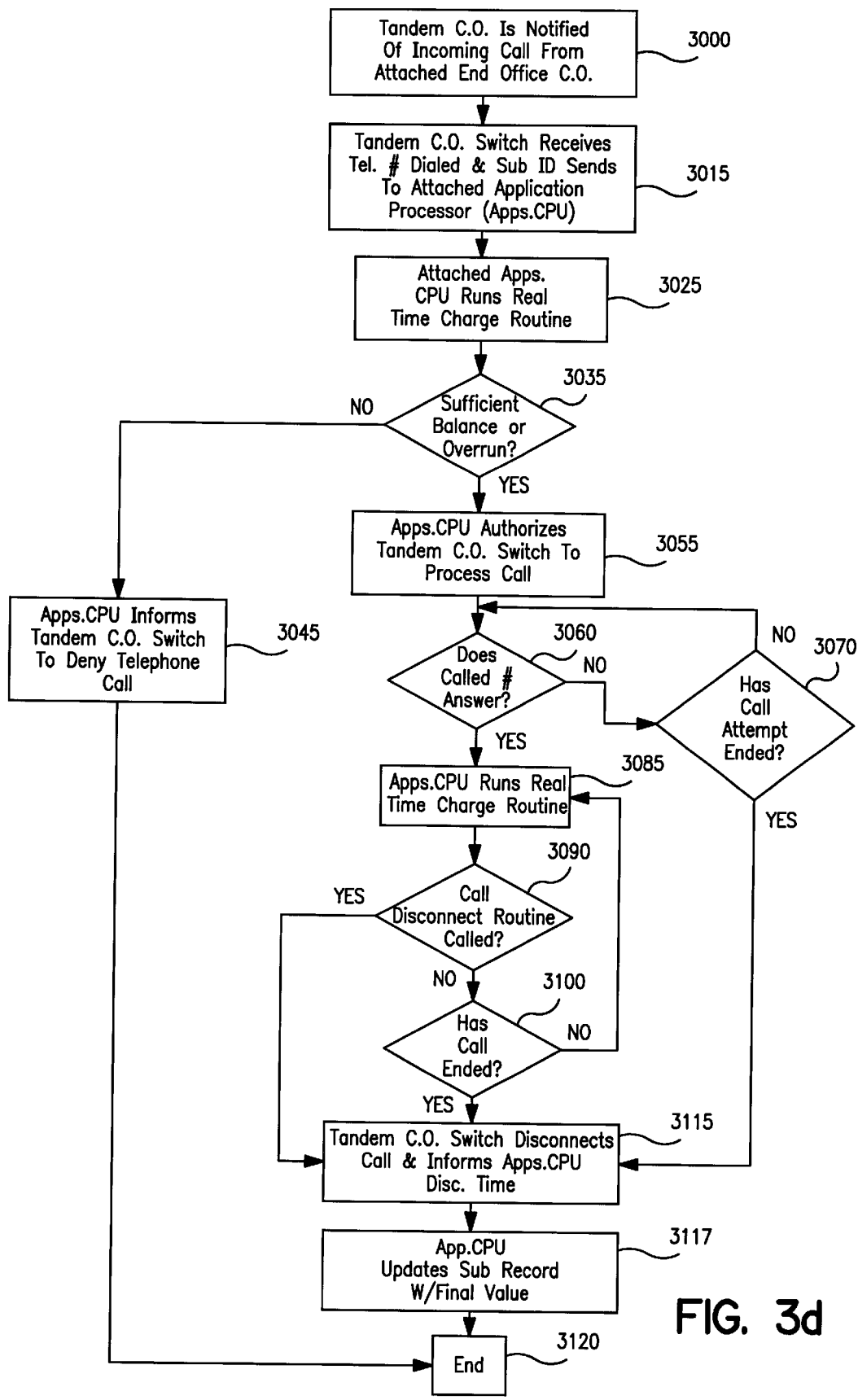

An exemplary real time billing process performed by the tandem CO switch configuration illustrated in FIG. 3c is shown as a flowchart in FIG. 3d. The flowchart in FIG. 3d is similar to that in FIG. 3b. In FIG. 3d, the process begins at step 3000 at which the tandem CO switch 120 is notified of an incoming interoffice trunk call from the end office CO switch 105.

At step 3015, the tandem CO switch 120 receives the telephone number dialed from the end office CO switch 105, requests and receives the calling subscriber number, and forwards this information to the Apps.CPU 300. The Apps.CPU 300 checks for a VSUB for the calling subscriber, which can be programmed into the Apps.CPU.

At step 3025, the Apps.CPU 300 performs the RTCR for the VSUB. At step 3035, a determination is made whether there is a sufficient usable balance or an approved overrun for the VSUB based on the RTCR. If not, the process proceeds to step 3045 at which the Apps.CPU 300 instructs the tandem CO switch 120 to deny the call.

If, at step 3035, it is determined that there is a sufficient usable balance or an approved overrun for the VSUB, the process proceeds to step 3055 at which the Apps.CPU 300 authorizes the tandem CO switch 120 to process the call. The tandem CO switch 120 processes the call and informs the Apps.CPU 300 of the answer status.

Next, at step 3060, the tandem CO switch 120 determines whether the called number answers. If not, the process proceeds to step 3070 at which the tandem CO switch 120 determines whether the call attempt has ended. If the call attempt has not ended, the process returns to step 3060.

If, at step 3060, the tandem CO switch 120 determines that the called number has answered, the process proceeds to step 3085 at which the tandem CO switch informs the Apps.CPU 300 that the called number has answered, and the Apps.CPU 300 runs the RTCR again immediately so that all charges can be applied in real time.

Next, at step 3090, a determination is made whether the call disconnect routine has been invoked by the Apps.CPU because, based on the RTCR, the VSUB does not have sufficient approval to proceed with the call. If the call disconnect routine has not been invoked, the process proceeds to step 3100.

At step 3100, the tandem CO switch 120 determines whether the call has ended. If the call has not ended, the process returns to step 3085. From step 3045, or if, at step 3090 it is determined that the call disconnect routine has been invoked, at step 3100 it is determined that the call has ended, or at step 3070 it is determined that the call attempt has ended, the process proceeds to step 3115 at which the tandem CO switch 120 disconnects the call and informs the Apps.CPU 300 of the disconnect time so that the Apps.CPU can update the VSUB record of the final charge value. The App.CPU 300 updates the subscriber record with the final charge value at step 3117 and creates the final CDR for this call. The process then ends at step 3120. According to a third embodiment of the present invention, rather than having one deposit or credit for each subscriber, there can be one debit or credit account covering multiple subscribers. This can be useful, for example, in a business that has more than one line or a Public Call Office (PCO) operated by a franchise or independent operator.

According to this embodiment, a group of trunks, subscriber lines, or services can be identified as a single Billing Group (BG). All the features of the real time subscriber billing system, including prepaid deposits and credit limits, can be applied to the BG as a whole in the same way as previously described for a single subscriber. The trunks, lines, and services associated with the BG can originate in more than one switch.

Service group billing permits subscribers to charge telephone, paging, cellular, and other communication services to a single account. For example, all charges from the BG can be charged to a main billing number. The COS for auxiliary billing numbers can be established by the main billing number.

FIG. 4a illustrates a network tandem CO switch 150 in which real time billing processing can be performed according to the third embodiment of the present invention. In FIG. 4a, the BG is represented by a private/foreign network 400. The private/foreign network 400 comprises one or more switches which are run/administered by an entity other than that running/administering the network tandem CO switch 150. The private/foreign network 400 is connected to the network tandem switch 150 via standard central office trunks 410. The connection between the network tandem CO switch 150 and the private/foreign network 400 can incorporate any method of signaling that provides standard interoffice call handling information such as call setup, call tear down, calling and called number identification, etc.

In FIG. 4a, the real time billing processing can be performed in a CPU 160 in the network tandem CO switch 150. The CPU 160 is programmed with trunk groups for each different private/foreign network connected. The network tandem CO switch 150 monitors the trunk(s) and runs the RTCR.

Figure 4B:
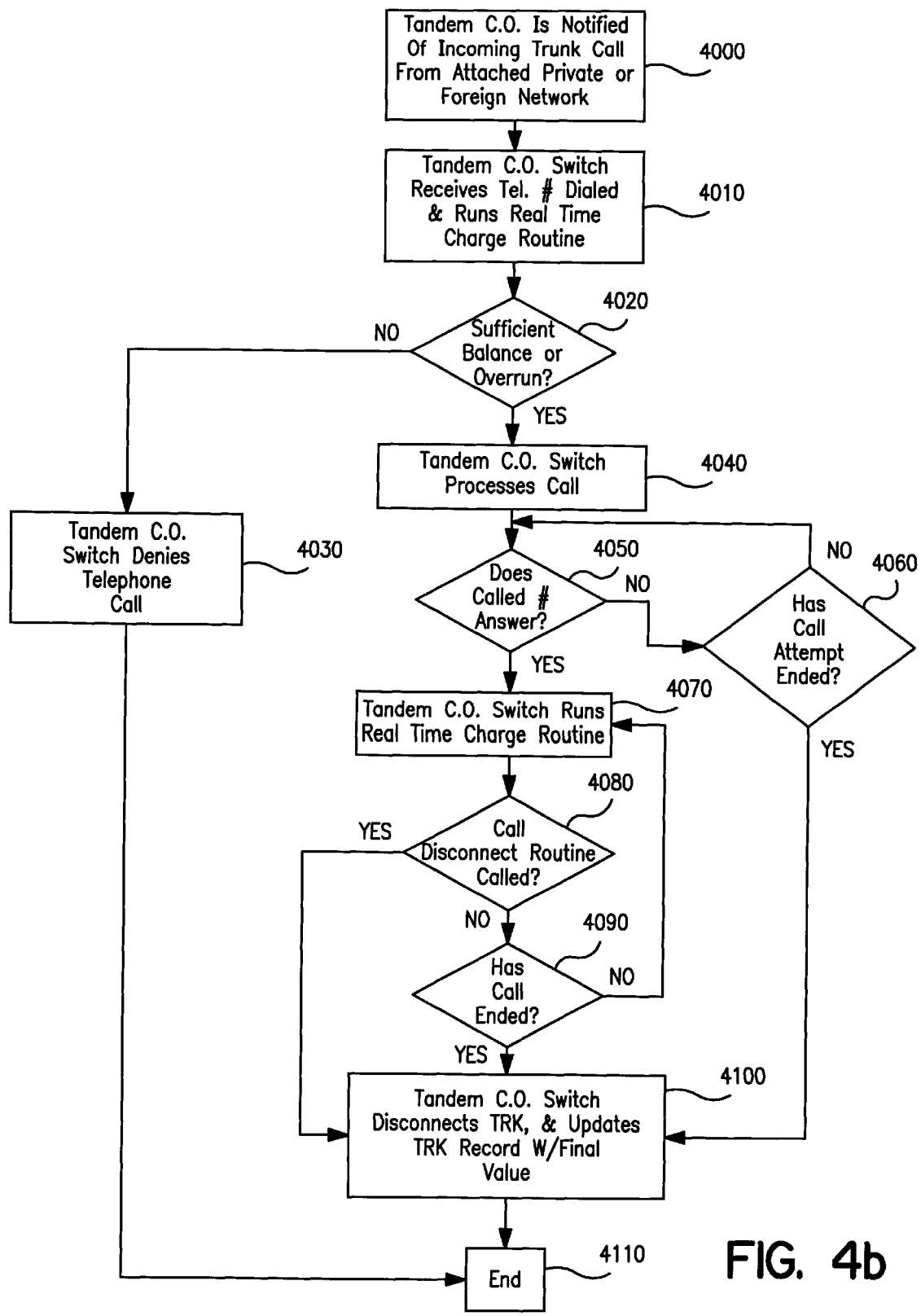

FIG. 4b is a flowchart illustrating an exemplary real time subscriber billing process performed in the network tandem CO switch shown in FIG. 4a. Referring to FIG. 4b, the network tandem CO switch 150 is notified of an incoming interoffice trunk call from the private/foreign network 400 at step 4000. At step 4010, the network tandem CO switch 150 receives the telephone number dialed, identifies the trunk ID, and checks for a Trunk Record (TR) for this trunk. The trunk ID uniquely identifies the trunk by a trunk number and contains information on the type of signalling used as well as the COS, the subscriber's usable balance, etc. The TR contains information for the trunk such as account balances, credit information, class of service, record of calls, etc. The TR can, for example, be stored in Billing Data Memory 74 in the network tandem CO switch 150. The network tandem CO switch 150 also performs the RTCR for the TR.

At step 4020, the network tandem CO switch 150 determines whether there is a sufficient usable balance or an approved overrun for the TR based on the RTCR. If not, the process proceeds to step 4030 at which the network tandem CO switch 150 denies the call.

If, at step 4020, it is determined that there is a sufficient usable balance or an approved overrun for the TR, the process proceeds to step 4040 at which the network tandem CO switch 150 processes the call. Next, at step 4050, the network tandem CO switch 150 determines whether the called number answers. If not, the process proceeds to step 4060 at which a determination is made whether the call attempt has ended. If the call attempt has not ended, the process returns to step 4050.

If, at step 4050, it is determined that the called number has answered, the process proceeds to step 4070 at which the network tandem CO switch 150 runs the RTCR again immediately so that all charges can be applied in real time. Next, at step 4080, a determination is made whether the call disconnect routine has been invoked because, based on the RTCR, the TR does not have sufficient approval to proceeds with the call. If the call disconnect routine has not been invoked, the process proceeds to step 4090. At step 4090, the network tandem CO switch 150 determines whether the call has ended. If the call has not ended, the process returns to step 070.

From step 4030, a determination at step 4080 that the call disconnect routine has been invoked, a determination at step 4090 that the call has ended, or a determination at step 4060 that the call attempt has ended, the process proceeds to step 4100. At step 4100, the network tandem CO switch 150 disconnects the call, updates the TR with the final charge value, and creates the final CDR for the call. The process then proceeds to step 4110 at which it ends.

Figure 4C:
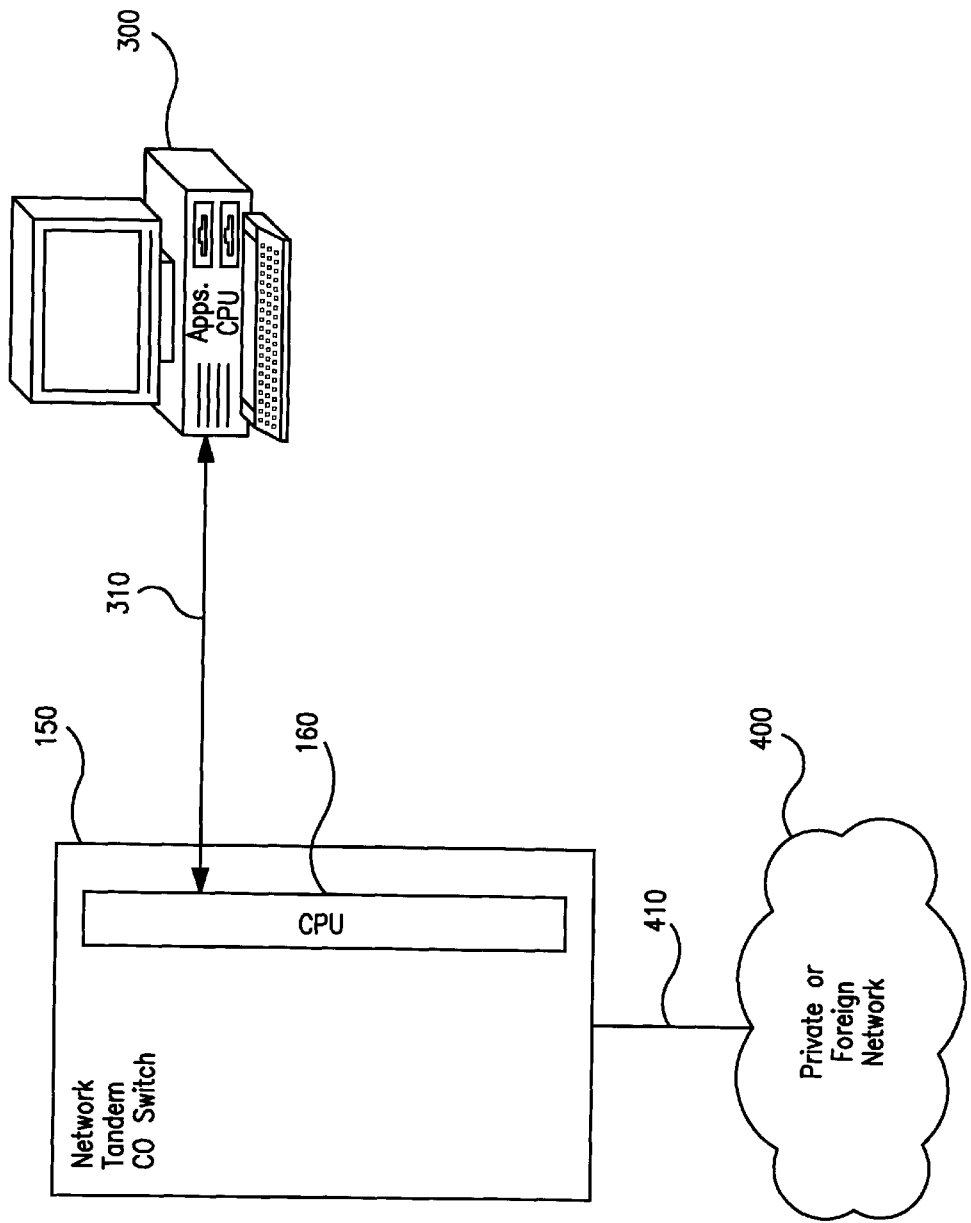

In FIG. 4a, real time billing processing occurs in the CPU 160 which stores the RTCR and the trunk account balances. Alternately, real time billing processing can be performed in an Apps.CPU 300 connected to the network tandem CO switch 150 via a switch interface 310 as shown in FIG. 4c. In this case, the RTCR and the trunk account balances are stored in the Apps.CPU 300.

Figure 4D:
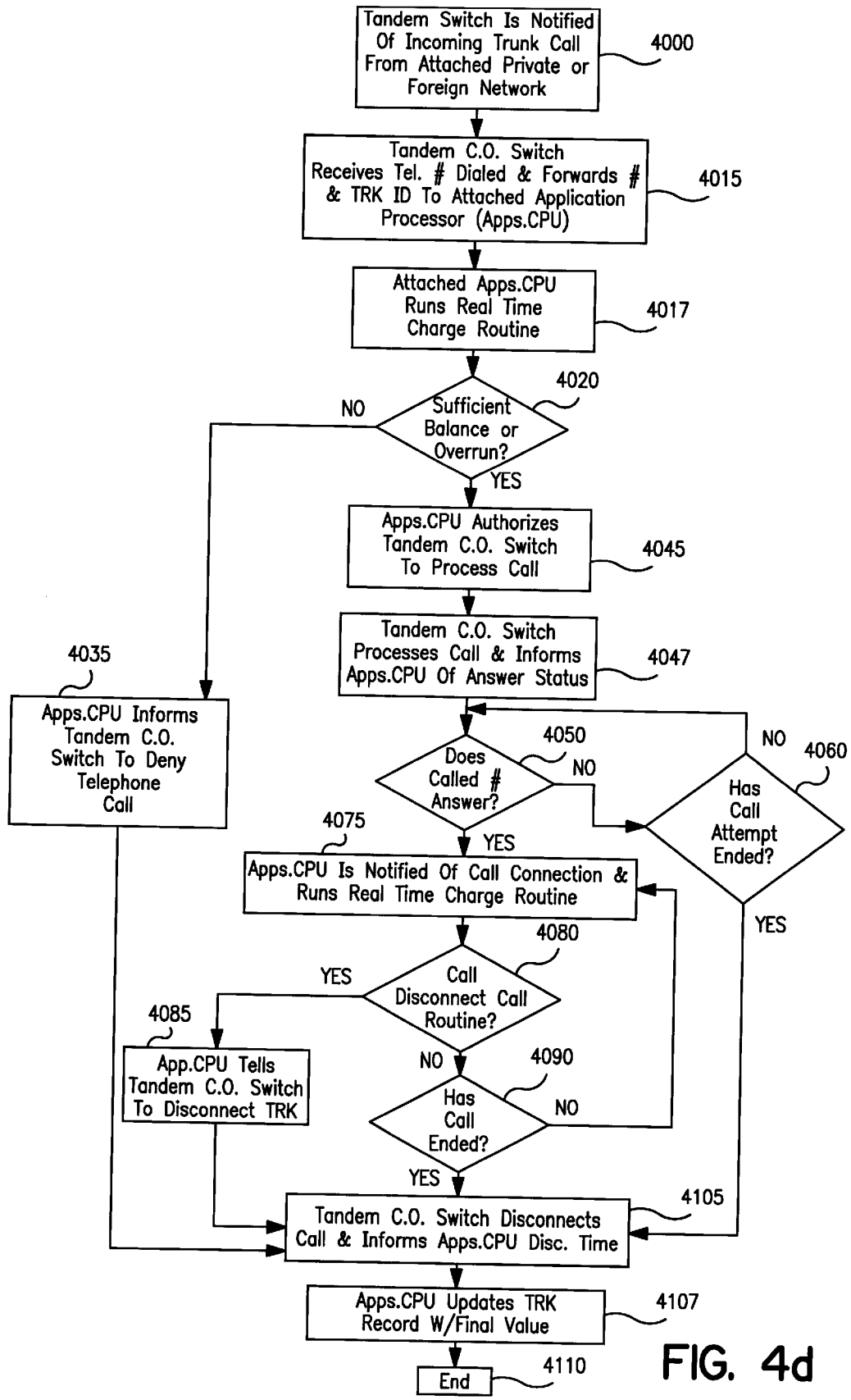

FIG. 4d is a flowchart illustrating an exemplary real time billing process performed in the network tandem CO switch configuration shown in FIG. 4c. FIG. 4d is similar to FIG. 4b. Referring to FIG. 4d, the process begins at step 4000 at which the network tandem CO switch 150 is notified of an incoming interoffice trunk call from the private/foreign network 400.

At step 4015, the network tandem CO switch 150 receives the telephone number dialed, identifies the trunk ID, and forwards this information to the attached Apps.CPU 300. The Apps.CPU 300 checks for a TR for this trunk. At step 4017, the Apps.CPU 300 performs the RTCR for the TR.

At step 4020, a determination is made whether there is a sufficient usable balance or an approved overrun for the TR based on the RTCR. If not, the process proceeds to step 4035 at which the Apps.CPU 300 instructs the network tandem CO switch 150 to deny the call.

If, at step 4020, it is determined that there is a sufficient usable balance or an approved overrun for the TR, the process proceeds to step 4045 at which the Apps.CPU 300 authorizes the network tandem CO switch 150 to process the call. At step 4047, the network tandem CO switch 150 processes the call and informs the Apps.CPU 300 of the answer status.

At step 4050, the network tandem CO switch 150 determines whether the called number answers. If not, the process proceeds to step 4060 at which the network tandem CO switch 150 determines whether the call attempt has ended. If the call attempt has not ended, the process returns to step 4050.

If, at step 4050, it is determined that the called number has answered, the process proceeds to step 4075 at which the network tandem CO switch 150 notifies the Apps.CPU 300 of the call connection. The Apps.CPU 300 runs the RTCR again immediately so that all charges can be applied in real time.

At step 4080, a determination is made whether the call disconnect routine has been invoked. If the call disconnect routine has been invoked, the process proceeds to step 4085 at which the Apps.CPU 300 issues a disconnect request to the network tandem CO switch 150 to disconnect the trunk call.

If, at step 4080, it is determined that the call disconnect routine has not been invoked, the process proceeds to step 4090 at which a determination is made whether the call has ended. If the call has not ended, the process returns to step 4075.

From step 4035, step 4085, a determination at step 4090 that the call has ended, or a determination at step 4060 that the call attempt has ended, the process proceeds to step 4105 at which the network tandem CO switch 150 disconnects the call and informs the Apps.CPU 300 of the disconnect time. Then, the process proceeds to step 4107 at which the Apps.CPU updates the TR with the final charge value and creates the final CDR for this call. Finally, the process proceeds to step 4110 at which it ends.

Figure 5A:
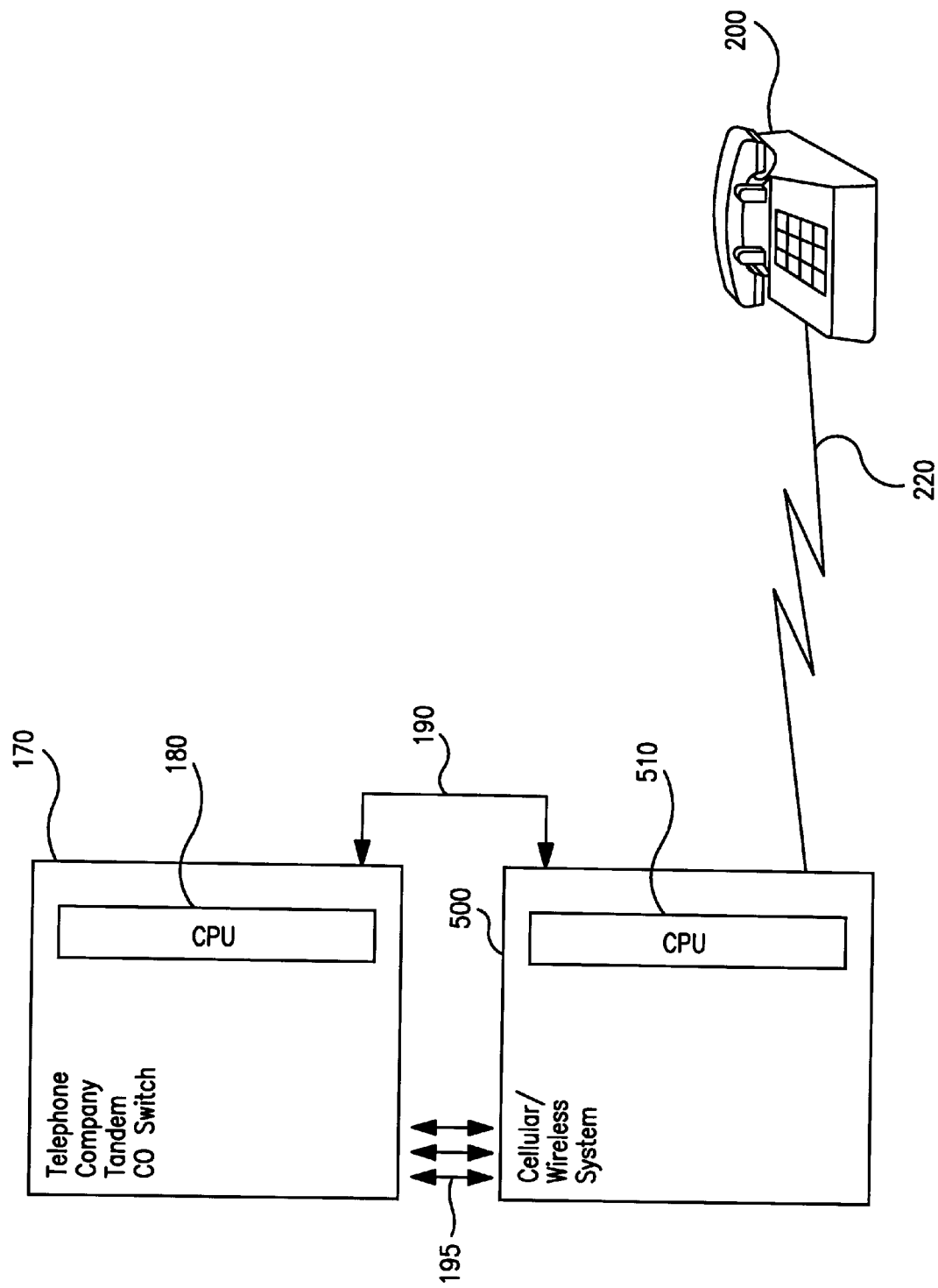
FIGS. 5a–5d illustrate a central office switch connected to a cellular/wireless system for real time subscriber billing according to a fourth embodiment of the present invention.

The present invention is not limited to wireline subscribers but may also be applicable to cellular and/or wireless subscribers. Thus, according to a fourth embodiment, the real time billing system can be implemented in a central office switch connected to a cellular/wireless system to which subscribers are attached. FIG. 5a illustrates a telephone company CO tandem switch 170 in which real time subscriber billing can be performed according to the fourth embodiment. In FIG. 5a, the telephone company tandem CO switch 170 is connected to a cellular/wireless system 500 which provides wireless subscribers 200 with telephone service via, for example, a radio frequency (RF) link 220. In FIG. 5a, real time billing processing can be performed in the CPU 180 in the telephone company tandem CO switch 170. The telephone company tandem CO switch 170 is connected to the cellular/wireless system 500 via intersystem links 195 for voice paths and via a inter-system controller link 190 for inter-system data transfer exchanges.

Figure 5B:
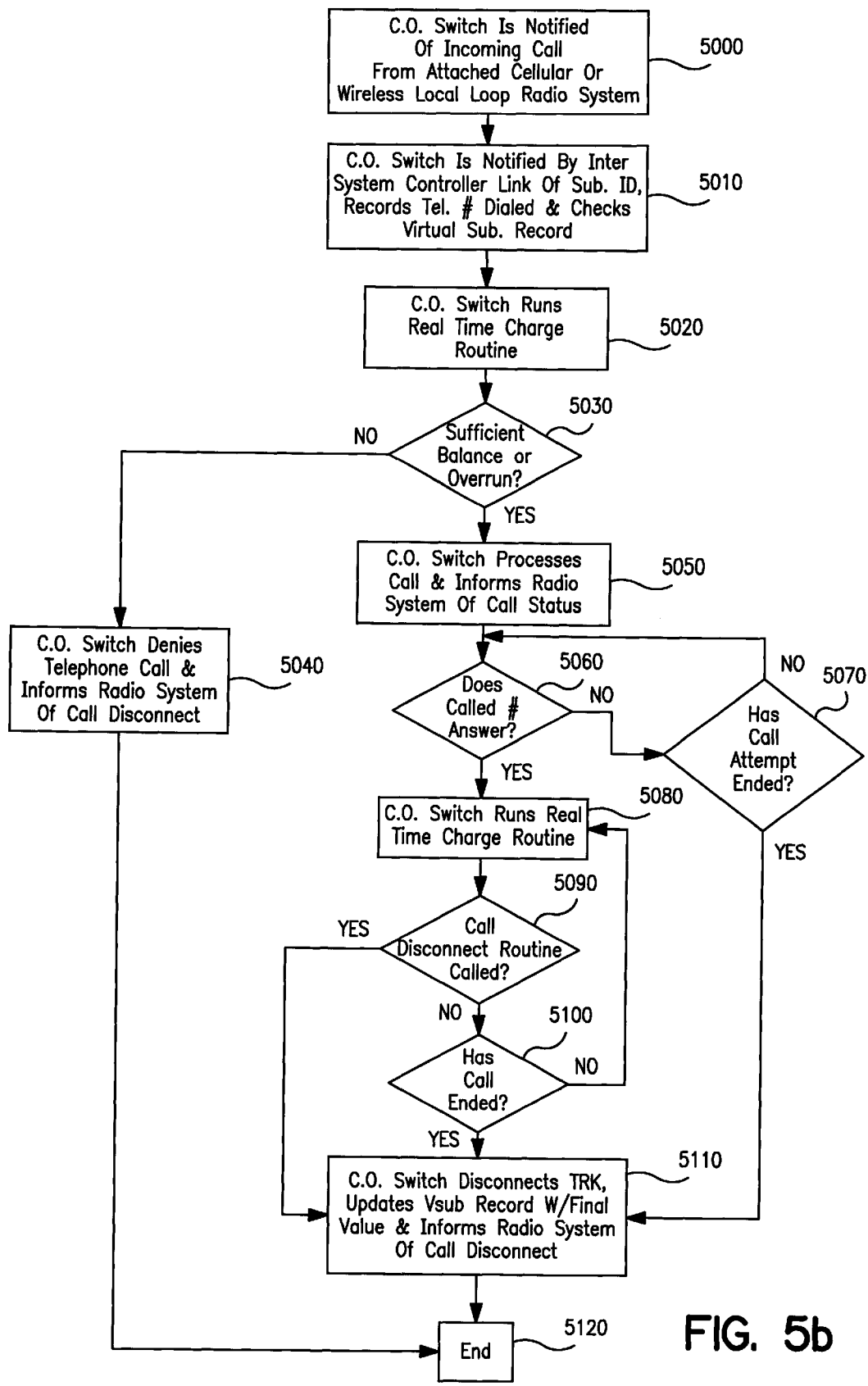

FIG. 5b is a flowchart illustrating an exemplary real time billing process performed in the telephone company tandem CO switch shown in FIG. 5a. Referring to FIG. 5b, the process begins at step 5000 at which the telephone company tandem CO switch 170 is notified of an incoming call from the attached cellular/wireless system 500 via the inter system controller link 190. The telephone company CO switch 170 is notified of the telephone number dialed and the calling subscriber number and checks for a VSUB for the calling subscriber. The VSUB can, for example, be stored in the Billing Data Memory 74 in the telephone company tandem CO switch 170.

At step 5020, the telephone company tandem CO switch 170 performs the RTCR for the VSUB. A determination is made at step 5030 whether there is a sufficient usable balance or an approved overrun for the VSUB based on the RTCR. If not, the process proceeds to step 5040 at which the telephone company tandem CO switch 170 denies the call and informs the cellular/wireless system 500 of the call disconnect. From there, the process proceeds to step 5120, at which it ends.

If, at step 5030; it is determined that there is a sufficient usable balance or an approved credit, the process proceeds to step 5050 at which the telephone company tandem CO switch 170 processes the call and informs the cellular/wireless system 500 of the call status. Next, at step 5060, the telephone company tandem CO switch 170 determines whether the called number answers. If not, the process proceeds to step 5070 at which a determination is made whether the call attempt has ended. If the call attempt has not ended, the process returns to step 5060.

If, at step 5060, the telephone company tandem CO switch 170 determines that the called number has answered, the process proceeds to step 5080 at which the telephone company tandem CO switch runs the RTCR again immediately so that all charges can be applied in real time. Next, at step 5090, a determination is made whether the call disconnect routine has been invoked. If the call disconnect routine has not been invoked, the process proceeds to step 5100 at which the telephone company tandem CO switch 170 determines whether the call has ended. If the call has not ended, the process returns to step 5080.

If, at step 5090 the call disconnect routine has been invoked, at step 5100 it is determined that the call has ended, or at step 5070 it is determined that the call attempt has ended, the process proceeds to step 5110 at which the telephone company tandem CO switch 170 disconnects the call and updates the VSUB record with the final charge value for this call. The telephone company tandem CO switch 170 creates the final CDR for this call and informs the attached cellular/wireless system 500 of the call disconnect. From step 5110, the process proceeds to step 5120, at which it ends.

Figure 5C:
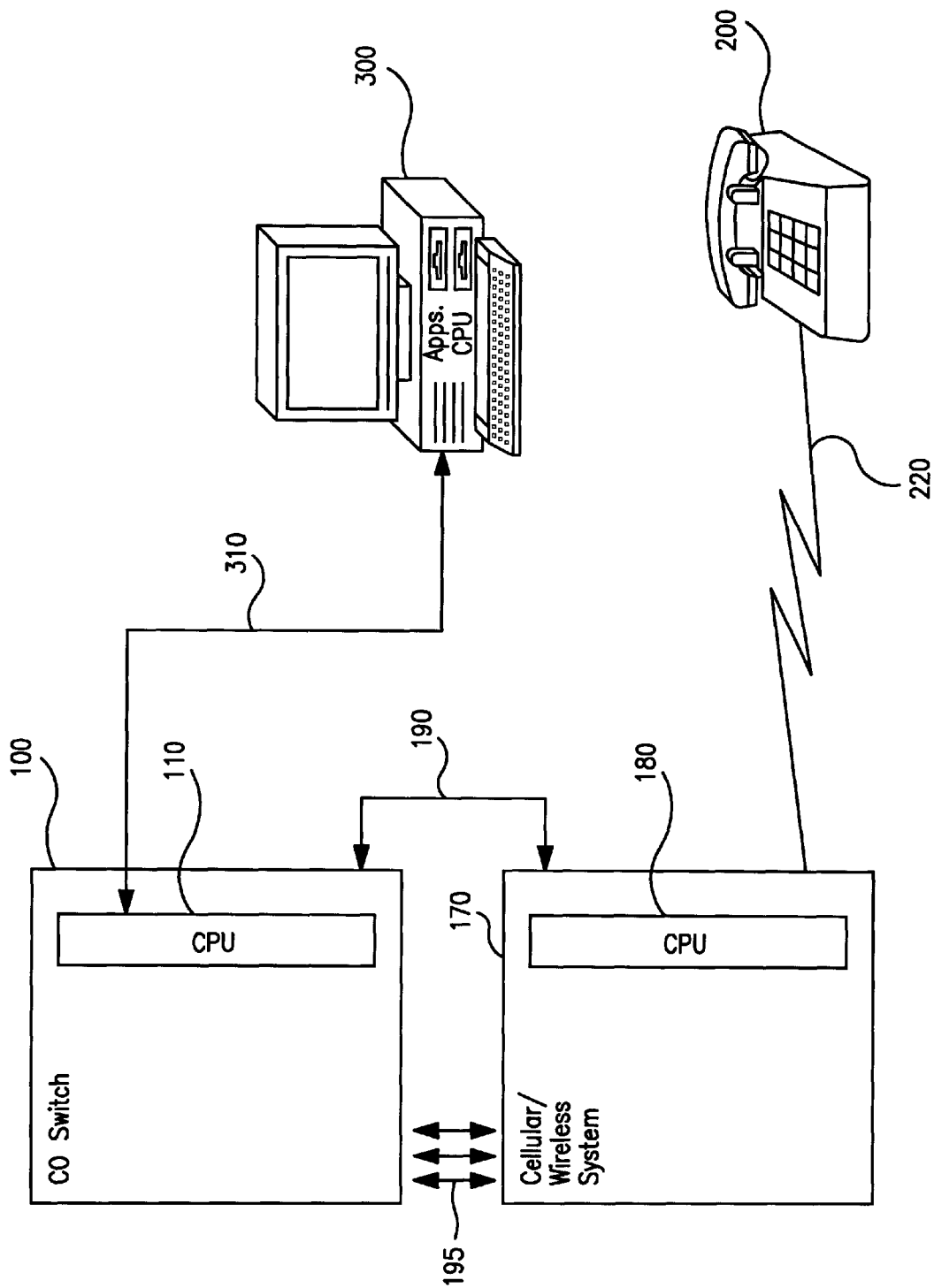

In FIG. 5a, real time billing processing occurs in the CPU 180 which stores the RTCR and the subscriber account balance. Alternately, real time billing processing can be performed in an Apps.CPU 300 that is connected to the CPU 180 via a switch interface 310 as shown in FIG. 5c. In this case, the RTCR and the subscriber account balance are stored in the Apps.CPU 300.

Figure 5D:
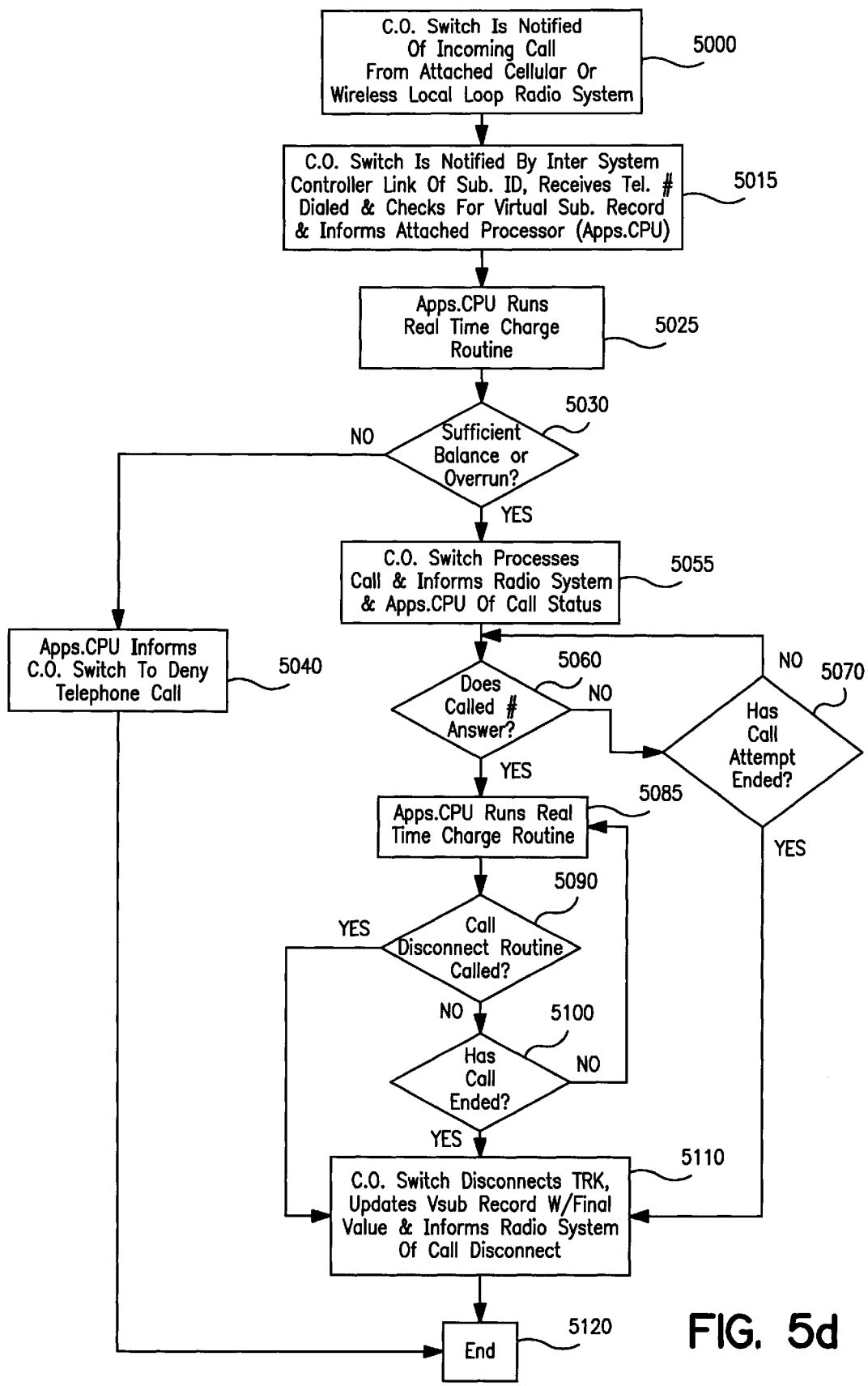

FIG. 5d is a flowchart illustrating an exemplary real time billing process performed in the telephone company tandem CO switch configuration shown in FIG. 5c. FIG. 5d is similar to FIG. 5b. Referring to FIG. 5d, the process begins at step 5000 at which the telephone company tandem CO switch 170 is notified of an incoming call from the attached cellular/wireless system 500. At step 5015, the telephone company tandem CO switch 170 is notified by the cellular/wireless system 500 via the inter system controller link 190 of the subscriber ID, receives the telephone number dialed, and forwards this information to the Apps.CPU 300. The Apps.CPU 300 checks for a VSUB for the calling subscriber, which can, for example, be programmed into the Apps.CPU.

At step 5025, the Apps.CPU 300 performs the RTCR for the VSUB. At step 5030, a determination is made whether there is a sufficient usable balance or an approved overrun for the VSUB based on the RTCR. If not, the process proceeds to step 5040 at which the Apps.CPU 300 informs the telephone company tandem CO switch 170 of the denial and instructs the switch to deny the call. From there, the process proceeds to step 5120, at which it ends.

If, at step 5025, it is determined that there is a sufficient usable balance or an approved overrun for the VSUB, the process proceeds to step 5055 at which the Apps.CPU 300 instructs the telephone company tandem CO switch 170 to process the call. The telephone company tandem CO switch 170 processes the call and informs the Apps.CPU and the cellular/wireless system 500 of the call status.

Next, at step 5060, the telephone company tandem CO switch 170 determines whether the called number answers. If not, the process proceeds to step 5070 at which a determination is made whether the call attempt has ended. If the call attempt has not ended, the process returns to step 5060. If, at step 5060, it is determined that the called number has answered, the process proceeds to step 5085 at which the telephone company tandem CO switch 170 informs the Apps.CPU 300 and the attached cellular/wireless system 500 via the inter-system controller link 195 of the call answer. The Apps.CPU 300 runs the RTCR again immediately so that all charges can be applied in real time.

At step 5090, a determination is made whether the call disconnect routine has been invoked. If not, the process proceeds to step 5100 at which a determination is made whether the call has ended. If the call has not ended, the process returns to step 5085. From a determination at step 5090 that the call disconnect routine has been invoked, a determination at step 5100 that the call has ended, or a determination at step 5070 that the call attempt has ended, the process proceeds to step 5110 at which the telephone company tandem CO switch 170 disconnects the call and informs the Apps.CPU 300 of the disconnect time so that the Apps.CPU can update the VSUB record of the final charge value. The Apps.CPU creates the final CDR for this call. The telephone company tandem CO switch 170 informs the attached cellular/wireless system 500 of the call disconnect. From step 5110, the process proceeds to step 5120, at which it ends.

According to a fifth embodiment of the present invention, the real time billing system can be implemented in a remote calling system which enables a subscriber to charge for calls placed from a telephone other than the subscriber's phone. There are two approaches for billing for remote calling: remote call billing and subscriber line remote call billing.

In remote call billing, when calling from a telephone within a network on a telephone other than the subscriber's phone, the subscriber identifies himself or herself to the network by, for example, keying in a credit identifying code followed by the telephone number to be called. The subscriber is prompted for identifying information such as a PIN and the telephone number to be charged for the call. This information is supplied by the subscriber and transmitted by a home switch or an attached computer in which real time billing processing occurs to a Remote Billing Computer (RBC) in the network. The RBC queries the home switch of the subscriber to determine if the subscriber has a sufficient balance in his or her account to make the call.

The RBC can temporarily charge the subscriber account with a sum sufficient to make a typical call and forward a limit to the servicing switch. The servicing switch then sets up a temporary subscriber account with the amount authorized by the home switch. As the call progresses and the servicing switch limit approaches, the servicing switch can automatically request additional limits from the RBC. The RBC then subtracts an additional amount from the balance in the home switch and forwards this amount to the servicing switch to be added to the temporary limit.

At the end of the call, any remaining unused amount in the servicing switch is returned to the RBC which, in turn, returns the unused amount to the home switch of the subscriber. The remaining amount is added back to the subscriber's balance.

Additional information can also be forwarded by the servicing switch to the RBC for transmission to the home switch. This can include the cost of the call, the telephone number dialed, the calling telephone number, date, start time, and ending time of the call, and so on.

In subscriber line remote billing, a subscriber can charge calls inside or outside of a network to his or her account by, for example, dialing a predetermined number and entering his or her own telephone number and PIN. The predetermined number is a number at the home switch of the subscriber. When the subscriber enters the predetermined number and PIN, the switch to which the subscriber is connected provides an outgoing line. The subscriber receives a dial tone and can place a call in a normal manner. The call is charged as described above.

Features that can be provided by the remote calling system according to the fifth embodiment of the present invention include a Personal Phone Number (PPN) and One Number Calling (ONC). The subscriber calls a predetermined phone number and identifies the telephone, pager, voice-mail, e-mail or facsimile machine for calls to be forwarded to. The type of call is detected by, for example, a network switch or a device attached to it for differentiating the type of call. For example, it can differentiate between voice, fax, and computer communications. Any calls to the subscriber's original number are automatically forwarded to the programmed number.

The forwarding charges can be paid by the subscriber or the calling party. If the calling party is to pay, a voice response can ask the calling party if he or she wants the call forwarded.

Figure 6A:
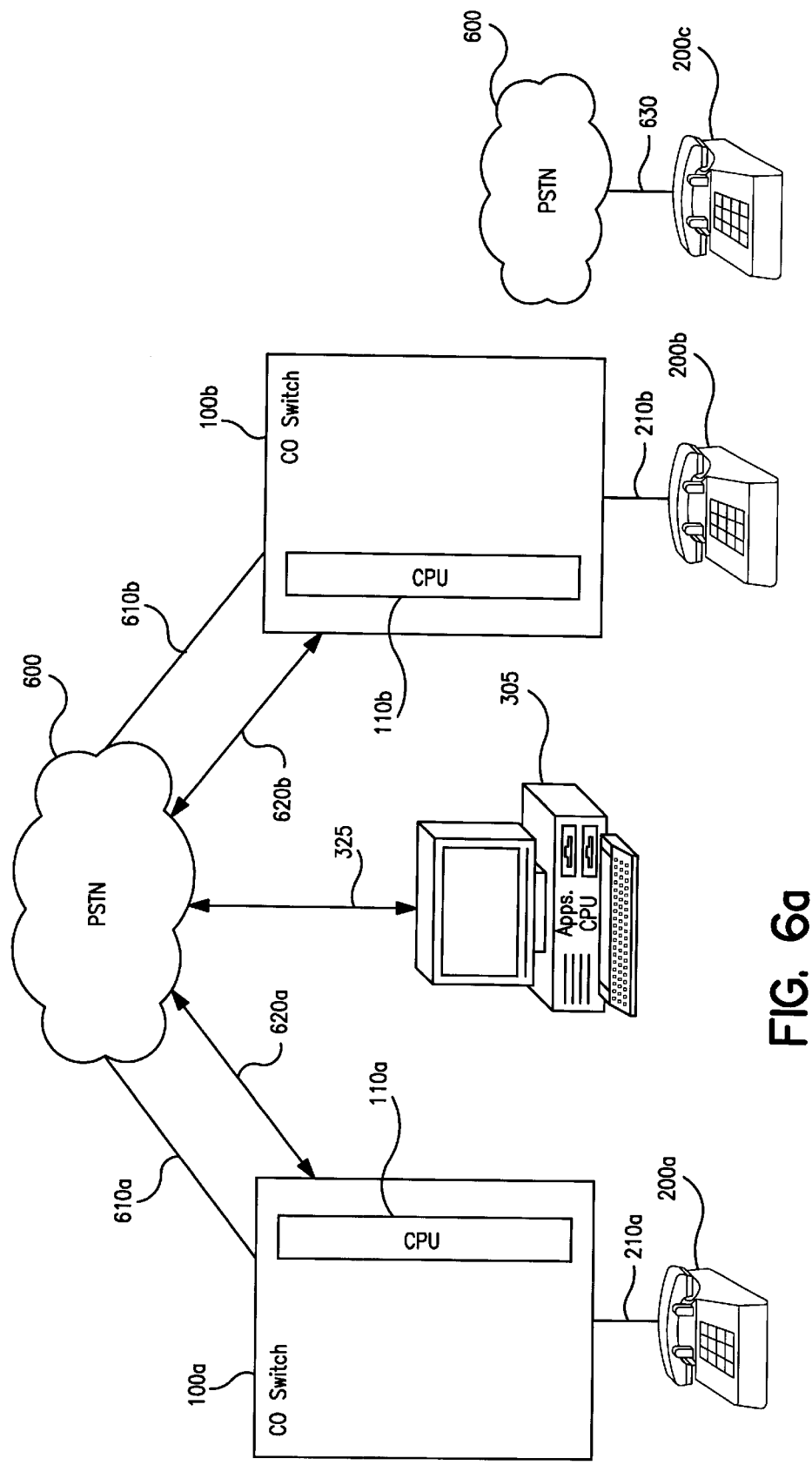
FIGS. 6a–6h illustrate a remote calling system for real time subscriber billing according to a fifth embodiment of the present invention.

FIG. 6a illustrates a remote calling system in which the real time subscriber billing system can be implemented according to the fifth embodiment of the present invention. In FIG. 6a, a telephone company network includes CO switches 100a and 100b which can perform real time billing processing for calls made from lines other than the subscribers' lines of record. The CO switches 100a and 100b include CPUs 110a and 110b, respectively, in which the real time billing processing occurs. The CO switches 100a and 100b are connected to subscribers 200a and 200b via subscriber lines 210a and 210b, respectively. The CO switches 100a and 100b are connected to a Public Switched Telephone Network (PSTN) 600 via internetwork trunks 610a and 610b and information transport links 620a and 620b, respectively. A subscriber need not be directly connected to a CO switch capable of real time billing to receive calls. For example, as shown in FIG. 6a, a subscriber 200c can be connected directly to the PSTN 600, via a trunk 630. Although only three subscribers are shown in FIG. 6a, one skilled in the art will appreciate that the real time billing system according to the fifth embodiment of the present invention can be applicable to any number of subscribers.

Also included in the remote calling system shown in FIG. 6a is a Network Application Processor (NAP) 305 connected to the PSTN 600 via a Network Interoffice Information Link (NL) 325. The NAP 305 serves as an RBC. Information regarding calls is transferred between the CO switches 100 and the NAP 305 via the link 325, the PSTN 600, the trunks 610a and 610b, and the links 620a and 620b using any number of protocols, including, for example, SS7, WAN, LAN, R1, R1.5, R2, etc.

Similar to that of credit card calling, a subscriber in the remote billing system in FIG. 6a can program his or her line with identifying information such as a PIN and then can, by dialing a special code, a home line number, and the PIN, call another line and charge that call to his or her home line account in real time. For example, a subscriber with a home subscriber line 200a can place a call from the subscriber line 200c and charge the call to the subscriber line 200a.

Figure 6B:
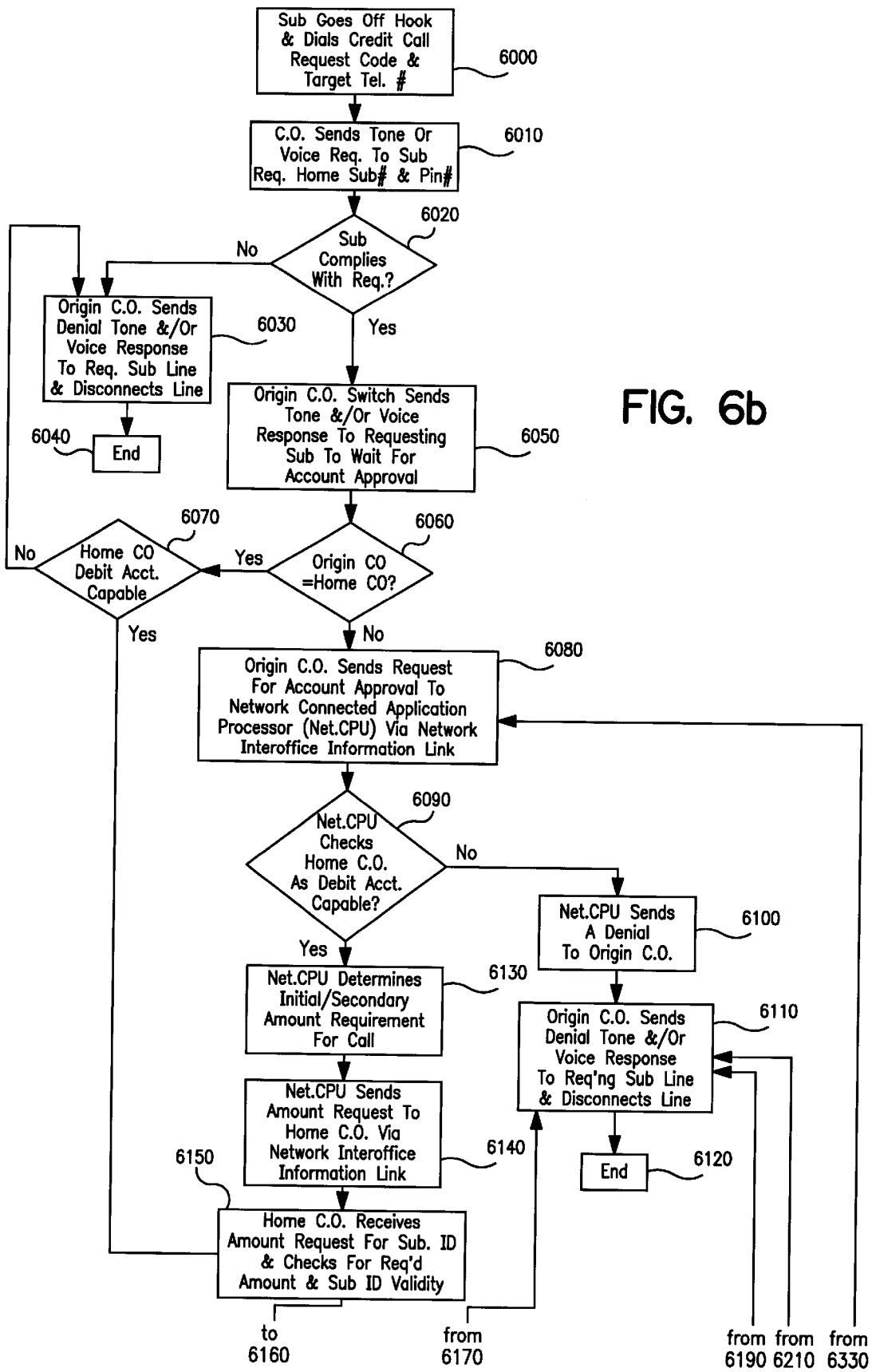
Figure 6C:
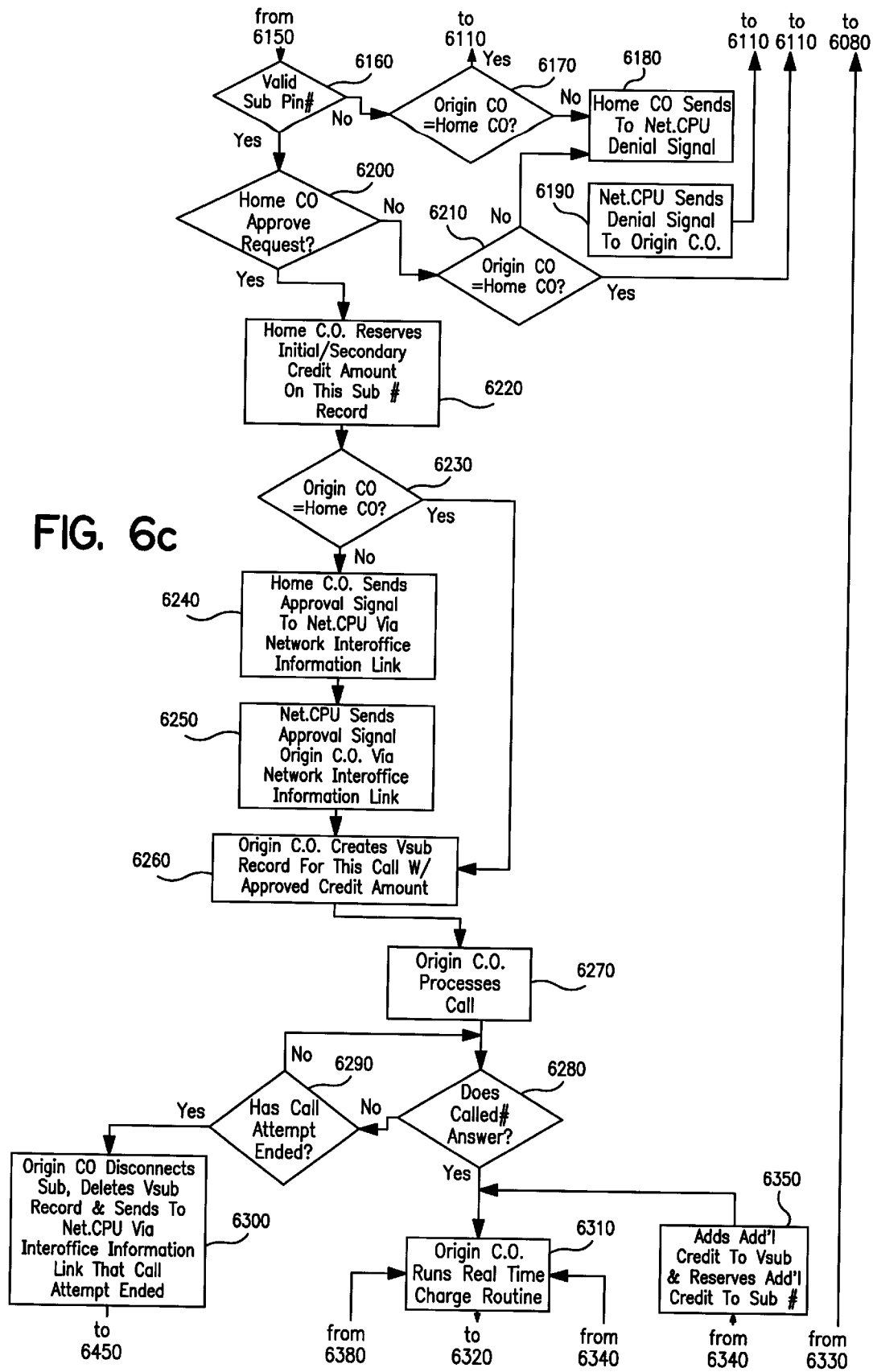
Figure 6D:
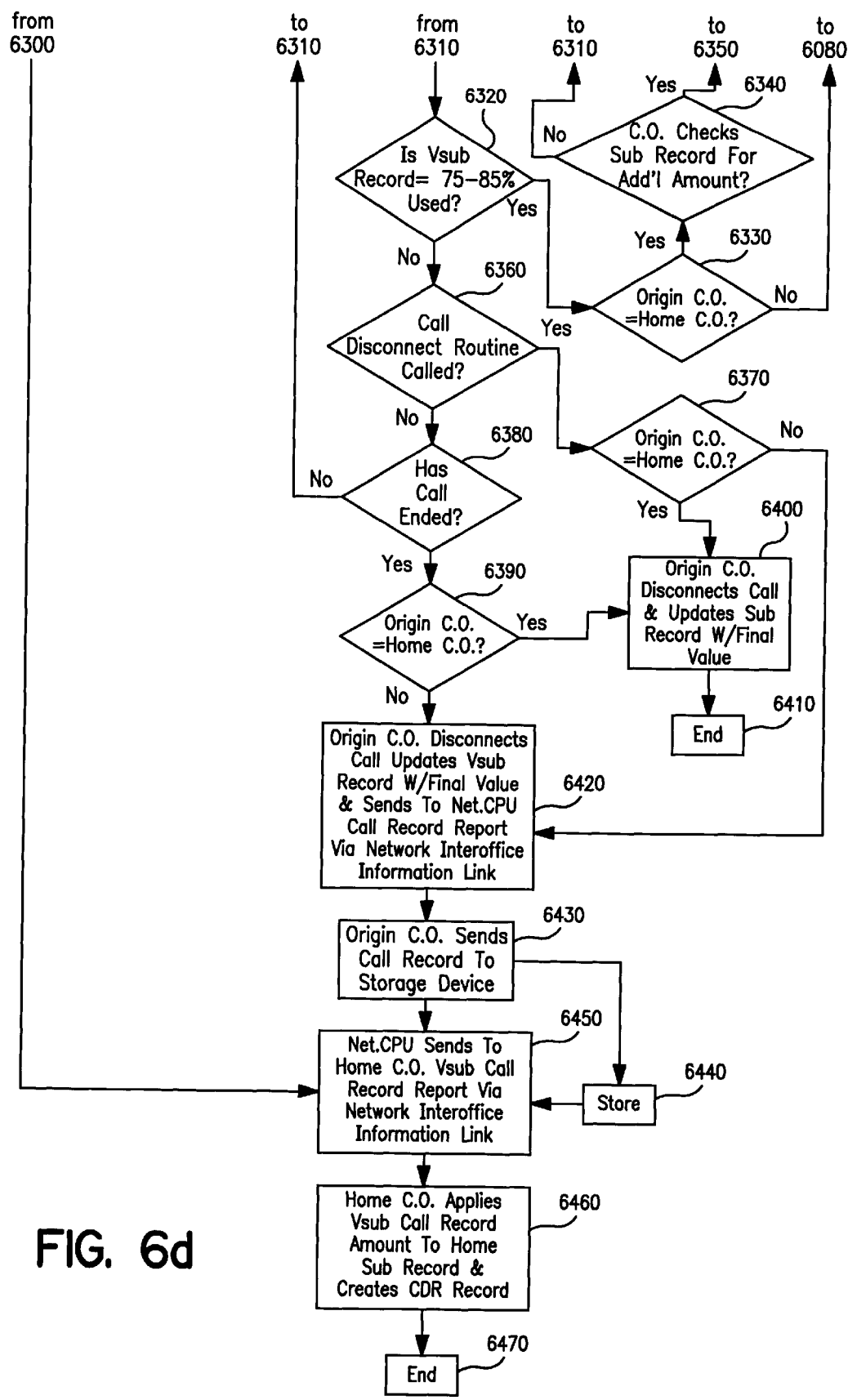

FIGS. 6b–d depict a flowchart illustrating an exemplary real time billing process performed in the remote calling system shown in FIG. 6a. Referring to FIG. 6b, the process begins at step 6000 at which a CO switch 100 is notified that a subscriber line has gone off hook and dialed the special code indicating that a remote call operation is requested. The CO switch is also notified of the target telephone number which the subscriber wishes to call. The CO switch in which the call originates is referred to as the Origin CO switch. The CO switch connected to the subscriber line to which the call is to be charged is referred to as the Home CO switch. The subscriber line to which the call is to be charged is referred to as the home subscriber line, and the subscriber line from which the call request originates is referred to as the requesting subscriber line. For example, referring to FIG. 6a, if a subscriber places a call from a requesting subscriber line 200b, and the subscriber's home subscriber line is 200a, the Origin CO switch corresponds to switch 100b, and the Home CO switch corresponds to switch 100a.

At step 6010, the Origin CO switch sends a tone or a voice request to the requesting subscriber line to input the number of the home subscriber line and the PIN of the subscriber. At step 6020, a determination is made whether the requesting subscriber line complies with the request.

If the requesting subscriber line does comply with the request, the process proceeds to step 6050 at which the Origin CO switch sends a tone or a voice request to the requesting subscriber line to wait for approval of the subscriber's account. At step 6060, the Origin CO switch determines if the requesting subscriber line and the home subscriber line reside in the same switch, i.e., if the Origin CO switch and the Home CO switch are the same. If the Origin CO switch and the Home CO switch are the same, the process proceeds to step 6070 at which it is determined whether the Home CO switch is capable of real time billing. If the Home CO switch is not capable of real time billing or if it is determined at step 6020 that the requesting subscriber line has not complied with the request of the Origin CO switch, the process proceeds to step 6030 at which the Origin CO sends a denial tone or a voice response to the requesting subscriber line and disconnects the line. The process then proceeds to step 6040 at which it ends.

If, at step 6060, it is determined that the Origin CO switch and the Home CO switch are not the same, the process proceeds to step 6080 at which the Origin CO switch sends a request to the NAP 305 requesting account approval for the call. The Origin CO switch sends the number of the home subscriber line, the home subscriber PIN, and the number of the requesting subscriber line to the NAP 305 via the NL 325.

Next, at step 6090, the NAP 305 checks an internal list of CO switches to determine if the Home CO switch is capable of real time billing. If is not, the process proceeds to step 6100 at which the NAP 305 sends a denial signal to the Origin CO switch. Next, at step 6110, the Origin CO switch sends a denial tone and/or a voice message response to the requesting subscriber line indicating that the call is denied and then disconnects the line. The process then proceeds to step 6120 at which it ends.

If, at step 6090, the Home CO switch is determined to be capable of real time billing, the process proceeds to step 6130:at which the NAP 305 determines the necessary amount required for the initial/secondary period of the call. The initial/secondary periods are time periods which can be established, for example, by the service provider. These periods can be different for different types of calls, e.g., there can be a different time period for a local call versus a long distance toll call.

Next, at step 6140, the NAP 305 sends to the Home CO switch a request for the amount determined at step 6130 via the NL 325. The NAP also sends to the Home CO switch the number of the home subscriber line, the home PIN, and the number of the requesting subscriber line.

From step 6140 or a determination at step 6070 that the Home CO switch is capable of real time billing, the process proceeds to step 6150 at which the Home CO switch receives a request and checks for the required amount in the subscriber's account and the validity of the number of the requesting subscriber line. From there the process proceeds to step 6160 in FIG. 5c. At step 6160 it is determined whether the home PIN is valid. If the home PIN is not valid, the process proceeds to step 6170 at which it is determined whether the Origin CO switch is the same as the Home CO switch. If the Origin CO switch is the same as the Home CO switch, the process returns to step 6110. If not, the process proceeds to step 6180 at which the Home CO switch sends to the NAP 305 a signal indicating denial. Then, at step 6190, the NAP 305 sends to the Origin CO switch a signal indicating denial, and the process returns to step 6110.

If, at step 6160, the PIN is determined to be valid, the process proceeds to step 6200 at which a determination is made whether the Home CO switch approves he request for the amount from the subscriber's account. If not, the process proceeds to step 6210 at which it is determined whether the Origin CO switch is the same as the Home CO switch. If the Origin CO switch is not the same as the Home CO switch, the process returns to step 6180. If the Origin CO switch is the same as the Home CO switch, the process returns to step 6110.

If, at step 6200, it is determined that the Home CO switch approves the request, the process proceeds to step 6220 at which the Home CO switch reserves the credit amount against this subscriber's record. If this is an initial request for this call and this subscriber, the amount is reserved as the initial request. If this is an additional request for an additional amount for the same call, the Home CO switch reserves the amount as an additional reserve against this subscriber for this call.

Next, at step 6230, a determination is made whether the Origin CO switch is the same as the Home CO switch. If not, the process proceeds to step 6240 at which the Home CO switch sends to the NAP 305 a signal indicating approval for the call.

Next, at step 6250, the NAP 305 sends to the Origin CO switch a signal indicating approval for this call. From step 6250 or a determination at step 6230 that the Origin CO switch is the same as the Home CO switch, the process proceeds to step 6260 at which the Origin CO switch creates a VSUB for the call. The VSUB is created by the Origin CO expressly and temporarily for this call.

At step 6270, the Origin CO switch processes the call. At step 6280, a determination is made whether the called number answers. If not, the process proceeds to step 6290 at which a determination is made whether the call attempt has ended. If the call attempt has not ended, the process returns to step 6280. If the call attempt has ended, the process proceeds to step 6300 at which the Origin CO disconnects the requesting subscriber line, deletes the VSUB, and notifies the NAP 305 via the NL 325 that the call attempt has ended.

If, at step 6280, it is determined that the called number has answered, the process proceeds to step 6310 at which the Origin CO switch performs the RTCR for the call and VSUB. From step 6310, the process proceeds to step 6320 shown in FIG. 6d.

At step 6320, a determination is made whether the Origin CO switch VSUB account balance is a predetermined percentage, e.g., 75–85%, used up. This predetermined percentage is selected, for example, by the service provider. If the account balance is between 75–85% used up, the process proceeds to step 6330 at which a determination is made whether the Origin CO switch is the same as the Home CO switch. If not, the process returns to step 6080 shown in FIG. 6b. If the Origin CO switch and the Home CO switch are the same, the process proceeds to step 6340 at which the Origin CO switch checks the home subscriber record for an additional amount. The additional amount is based upon an additional time period which can be established, for example, by the service provider and can be different for different types of calls. If no additional amount is available in the subscriber's account, the process returns to step 6310. If an additional amount is available, the process proceeds to step 6350 shown in FIG. 6c at which the Origin CO switch adds the additional amount to the VSUB and reserves the additional amount as an additional reserve to the home subscriber line record for this call. From step 6350, the process returns to step 6310.

If, at step 6320, it is determined that the VSUB record is not 75–85% used up, the process proceeds to step 6360 at which a determination is made whether the call disconnect routine has been invoked. If so, the process proceeds to step 6370 at which it is determined whether the Origin CO switch is the same as the Home CO switch. If the Origin CO switch is the same as the Home CO switch, the process proceeds to step 6400 at which the Origin CO switch disconnects the call, updates the VSUB record and the home subscriber line with the final charges, releases all reserve balances for this call, and creates a CDR. The process then proceeds to step 6410 at which it ends.

If, at step 6360, it is determined that the call disconnect routine has not been invoked, the process proceeds to step 6380 at which a determination is made whether the call has ended. If the call has not ended, the process returns to step 6310 shown in FIG. 6c. If the call has ended, a determination is made at step 6390 whether the Origin CO switch is the same as the Home CO switch. If the Origin CO switch is the same as the Home CO switch, the process proceeds to step 6400. If not, the process proceeds to step 6420 at which the Origin CO switch disconnects the call, finalizes the VSUB record with the final call charges, creates a CDR, and sends to the NAP 305 the call record report concerning the total charges used. At step 6430, the Origin CO switch sends the call record to an external or internal storage device, for example the DUR Memory 78, where it can be retained for future reference. At step 6440, the call record is stored.

From step 6300 shown in FIG. 6c or step 6440, the process proceeds to step 6450 at which the NAP 305 sends to the Home CO the VSUB call record as received from the Origin CO switch. At step 6460, the Home CO switch applies the VSUB call record to the home subscriber line, releases all reserve balances for this call to the home subscriber record, and creates a CDR. Finally, at step 6470, the process ends.

Figure 6E:
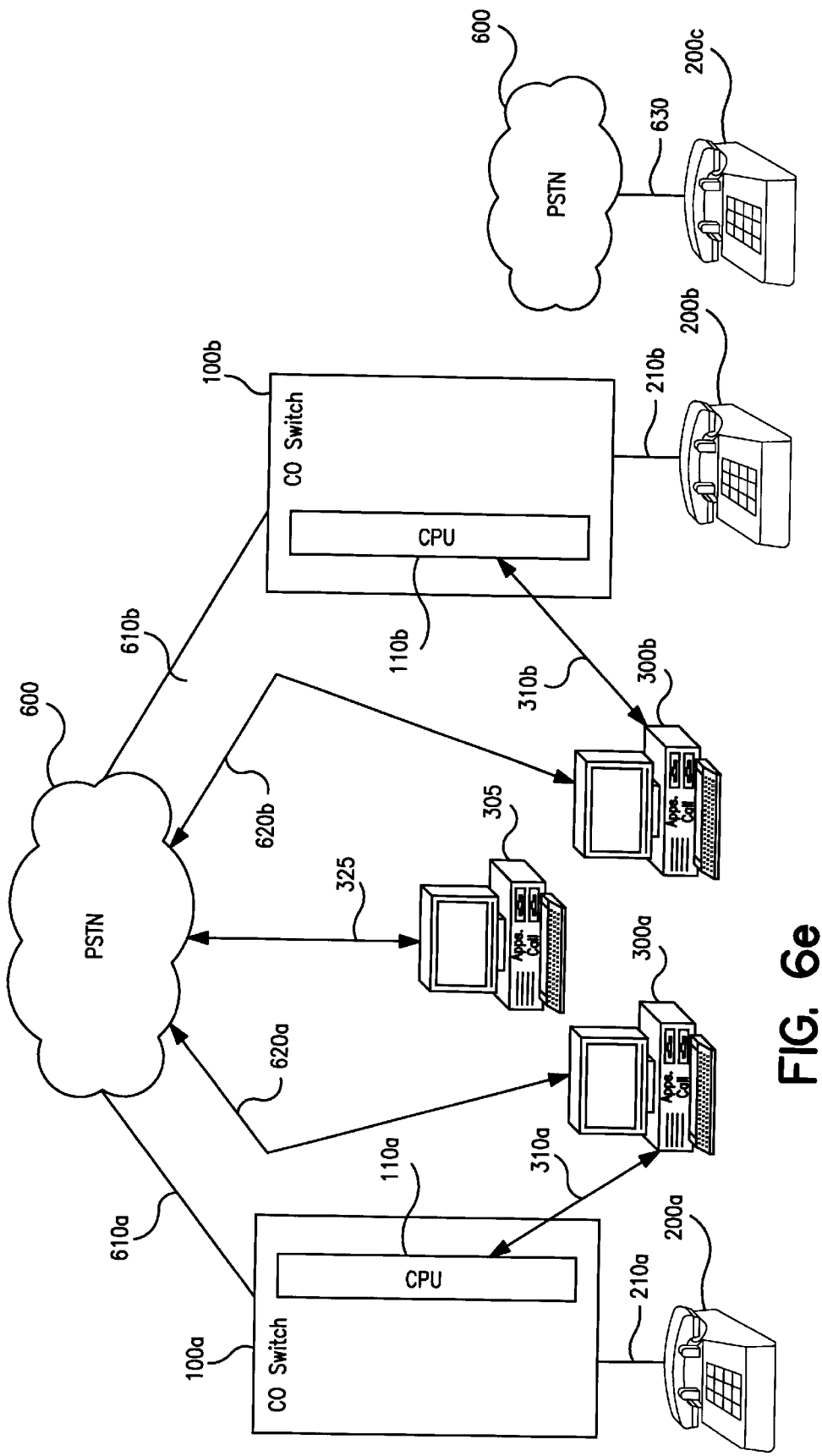

In FIG. 6a, real time billing processing occurs in the CPUs 110a and 110b in which the RTCRs are stored. Alternately, real time billing processing can be performed in Apps.CPUs 300a and 300b attached to the CO switches 100a and 100b via switch interfaces 310a and 310b, respectively, as shown in FIG. 6e. In this case, the RTCRs are stored in the Apps.CPUs 300a and 300b. The information transport links 620a and 620b are connected to the Apps.CPUs 300a and 300b, respectively.

Figure 6F:
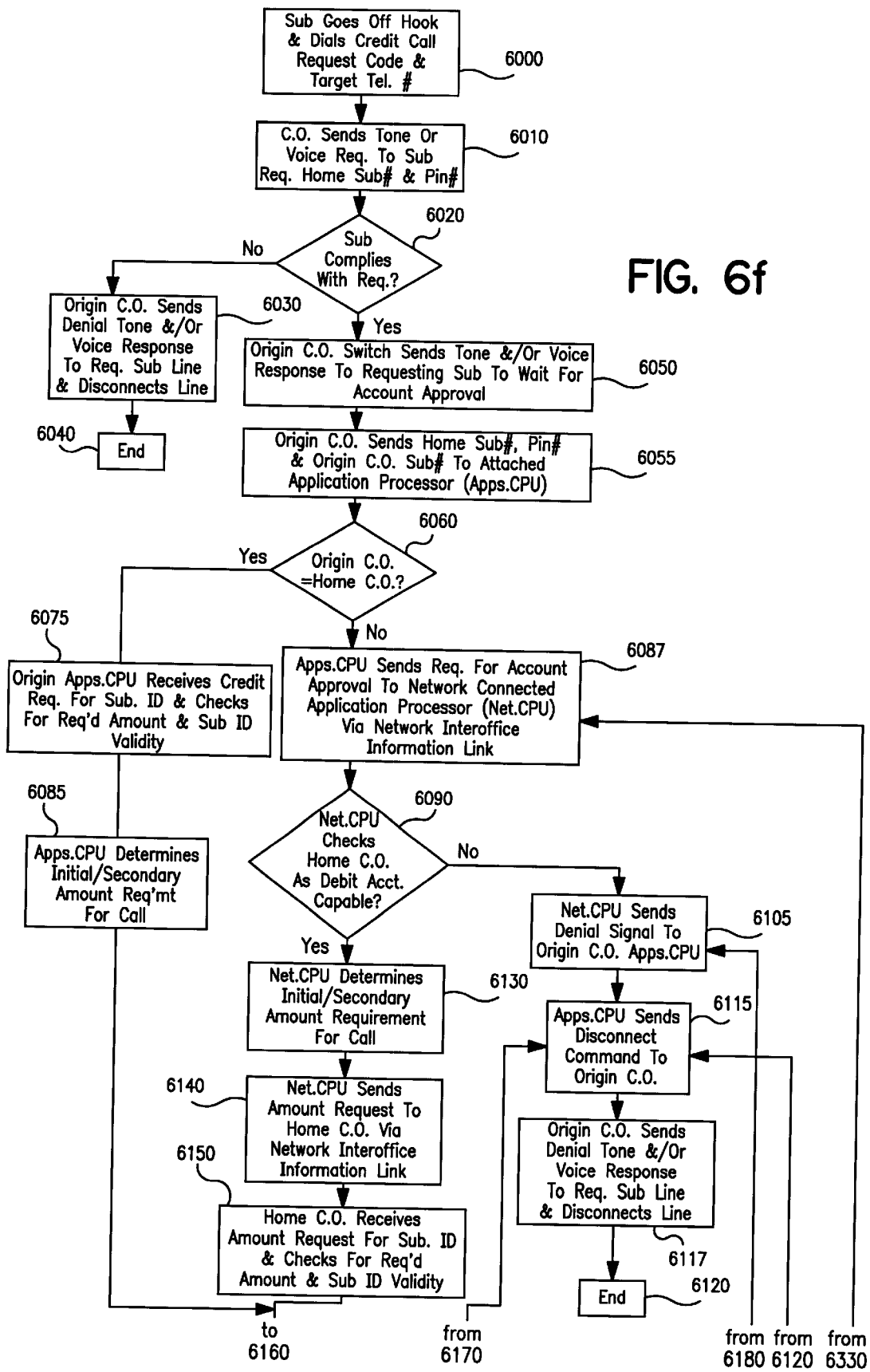
Figure 6G:
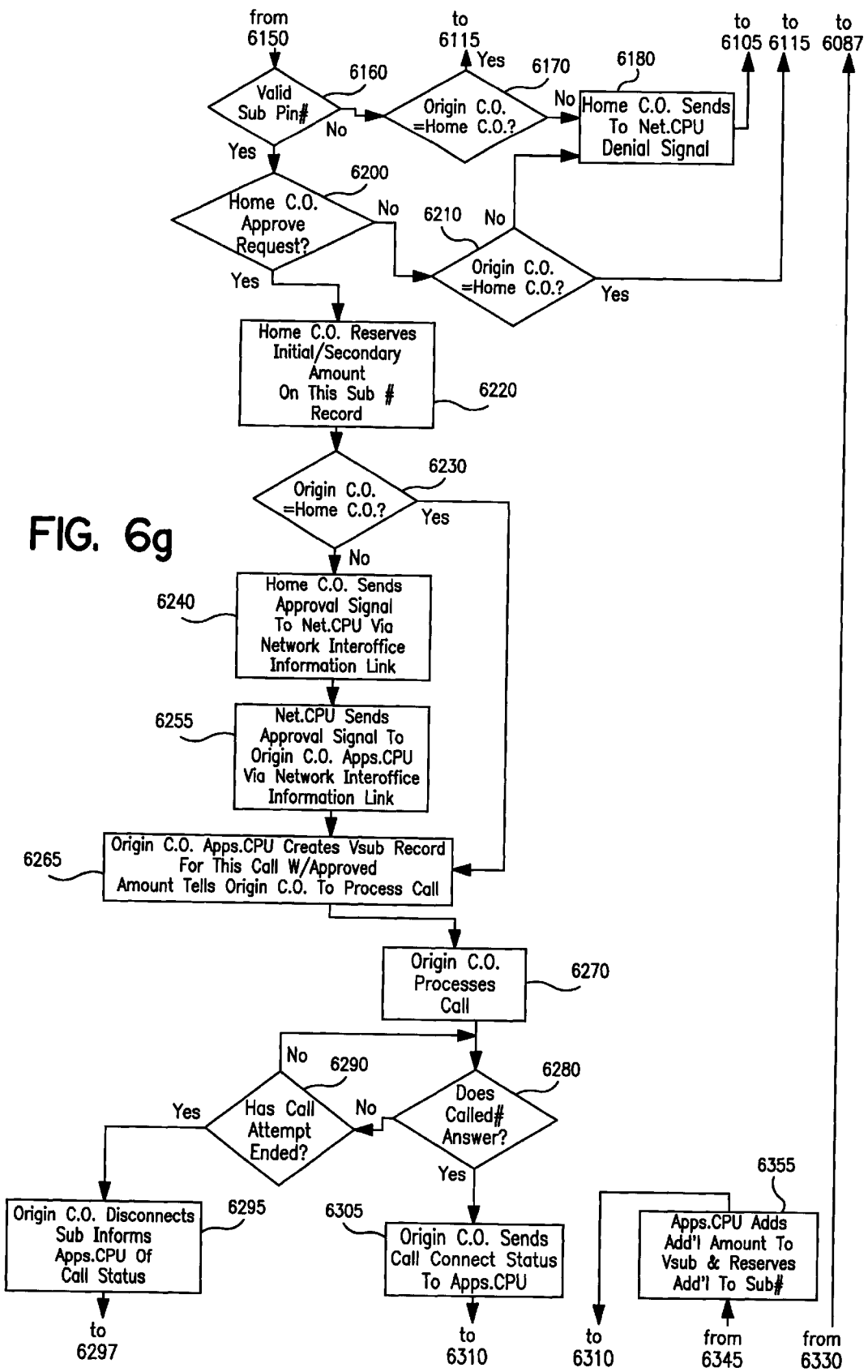
Figure 6H:
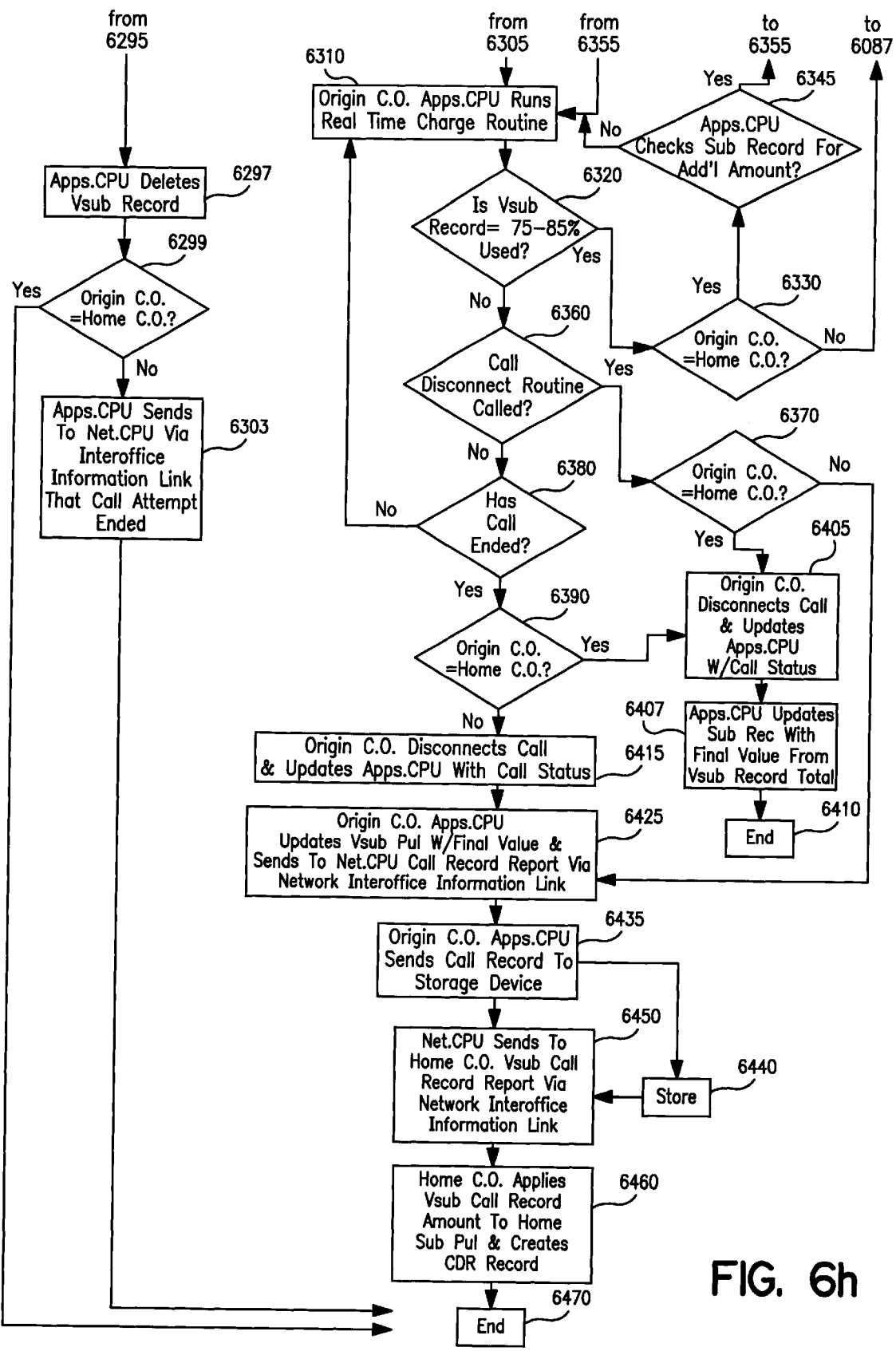

FIGS. 6f–h depict a flowchart illustrating an exemplary real time billing process performed in the remote calling system shown in FIG. 6e. FIGS. 6f–h are similar to FIGS. 6b–d. Referring to FIG. 6f, the process begins at step 6000 at which an Origin CO switch is notified that a subscriber line has gone off hook and dialed the special code indicating that a remote call operation is requested. The Origin CO switch is also notified of the target telephone number which the subscriber wishes to call.

At step 6010, the Origin CO switch sends a tone or a voice request to the requesting subscriber line to input the number of the home subscriber and the PIN of the subscriber. At step 6020, a determination is made whether the requesting subscriber line complies with the request. If the requesting subscriber line does not comply with the request, the process proceeds to step 6030 at which the Origin CO sends a denial tone or a voice response to the requesting subscriber line and disconnects the call. The process then proceeds to step 6040, at which it ends.

If, at step 6020, it is determined that the requesting subscriber line has complied with the request of the Origin CO switch, the process proceeds to step 6050 at which the Origin CO switch sends a tone or a voice request to the requesting subscriber line to wait for approval of the subscriber's account.

Then, at step 6055, the Origin CO switch sends to the attached Apps.CPU via the switch interface 310 the number of the home subscriber line, the PIN, the called telephone number, and number of the requesting subscriber line. Next, at step 6060, the Origin CO Apps.CPU determines if the Origin CO switch and the Home CO switch are the same. If the Origin CO switch and the Home CO switch are the same, the process proceeds to step 6075 at which the Origin CO switch Apps.CPU checks for the validity of the number of the home subscriber line and for the required amount.

At step 6085, the Origin CO switch Apps.CPU determines the amount required for initial/secondary periods the call. The process then proceeds to step 6160 described with reference to FIG. 6g.

If, at step 6060, the Origin CO and the Home CO are not determined to be the same, the process proceeds to step 6087 at which the Origin CO Apps.CPU sends a request to the NAP 305 requesting account approval for the call. The Origin CO Apps.CPU 300 sends the number of the home subscriber line, the home subscriber PIN, and the number of the requesting subscriber line to the NAP 305 via the NL 325.

Next, at step 6090, the NAP 305 checks an internal list of CO switches to determine if the Home CO switch is capable of real time billing. If is not, the process proceeds to step 6105 at which the NAP 305 sends a signal indicating denial to the Origin CO switch Apps.CPU.

Then, at step 6115, the Origin CO Apps.CPU sends to the Origin CO switch a disconnect command to end the call. At step 6117, the Origin CO switch sends a denial tone or a voice message response to the requesting subscriber indicating that the call is denied and then disconnects the line. The process then proceeds to step 6120 at which it ends.

If, at step 6090, the Home CO switch is determined to be capable of real time billing, the process proceeds to step 6130 at which the NAP 305 determines the necessary amount for the initial/secondary period of the call. Next, at step 6140, the NAP 305 sends to the Home CO switch a request for credit for the amount determined in step 6130. The NAP 305 also sends the number of the home subscriber line, the home subscriber PIN, and the number of the requesting subscriber line to the Home CO switch.

Next, at step 6150, the Home CO switch receives a request for an amount from the subscriber's account and checks for the required amount and the validity of the number of the requesting subscriber line.

From step 6150 or step 6085, the process proceeds to step 6160 shown in FIG. 6g. At step 6160, the Home CO switch checks to see if the PIN is valid. If the PIN is not valid, the process proceeds to step 6170 at which a determination is made whether the Origin CO switch is the same as the Home CO switch. If not, the process proceeds to step 6180 at which the Home CO Apps.CPU sends to the NAP 305 a signal indicating denial. The process then returns to step 6105 shown in FIG. 6f.

If, at step 6160, the PIN is determined to be valid, the process proceeds to step 6200 at which a determination is made whether the Home CO switch approves the request for the amount. If not, the process proceeds to step 6210 at which it is determined whether the Origin CO switch is the same as the Home CO switch. If not, the process returns to step 6180. If the Origin CO switch is the same as the Home CO switch, the process returns to step 6115 shown in FIG. 6f.

If, at step 6200, it is determined that the Home CO switch approves the request, the process proceeds to step 6220 at which the Home CO switch reserves the requested amount against the subscriber's record.

Next, at step 6230, a determination is made whether the Origin CO switch is the same as the Home CO switch. If not, the process proceeds to step 6240 at which the Home CO switch sends to the NAP 305 a signal indicating approval for the call.

Next, at step 6255, the NAP 305 sends to the Origin CO Apps.CPU a signal indicating approval for the call. From step 6255 or a determination at step 6230 that the Origin CO switch is the same as the Home CO switch, the process proceeds to step 6265 at which the Origin CO Apps.CPU creates a VSUB record for the call and instructs the Origin CO to process the call. The VSUB is created by the Origin CO expressly and temporarily for this call.

Next, at step 6270, the Origin CO switch processes the call. At step 6280, the Origin CO switch determines whether the called number has answered. If not, the process proceeds to step 6290 at which a determination is made whether the call attempt has ended. If the call attempt has ended, the process proceeds to step 6295 at which the Origin CO switch disconnects the requesting subscriber line and informs the Origin Apps.CPU of the call termination. Then, the process proceeds to step 6297 shown in FIG. 6h. At step 6297, the Origin CO Apps.CPU deletes the VSUB. Next, at step 6299, a determination is made whether the Origin CO switch is the same as the Home CO switch. If not, the process proceeds to step 6303 at which the Origin CO Apps.CPU notifies NAP 305 that the call attempt was unsuccessful.

Referring again to FIG. 6g, if, at step 6280, it is determined that the called number has answered, the process proceeds to step 6305 at which the Origin CO switch sends a call connect status to the Origin Apps.CPU. Next, at step 6310 shown in FIG. 6h, the Origin CO Apps.CPU runs the RTCR for the VSUB.

At step 6320, a determination is made whether the Origin CO Apps.CPU VSUB account balance is a predetermined percentage, e.g. between 75–85, used up.

If so, the process proceeds to step 6330 at which a determination is made whether the Origin CO switch is the same as the Home CO switch. If the Origin CO switch is the same as the Home CO switch, the process proceeds to step 6345 at which the Origin CO Apps.CPU checks the home subscriber record for an additional amount. If no additional amount is available, the process returns to step 6310. If an additional amount is available, the process proceeds to step 6355 shown in FIG. 6g at which the Origin CO Apps.CPU adds the additional amount to the VSUB and reserves the additional amount as an additional reserve to the home subscriber line record for this call. The process then returns to step 6310.

If, at step 6330, the Origin CO is determined not to be the same as the Home CO switch, the process returns to step 6087 shown in FIG. 6f.

If, at step 6320, it is determined that the VSUB record is not between 75–85% used up, the process proceeds to step 6360 at which a determination is made whether the call disconnect routine has been invoked. If so, the process proceeds to step 6370 at which it is determined whether the Origin CO switch is the same as the Home CO switch. If the Origin CO switch is the same as the Home CO switch, the process proceeds to step 6405 at which the Origin CO switch disconnects the call and updates the Origin Apps.CPU with the disconnect time. Then, at step 6407, the Origin Apps.CPU finalizes the VSUB record with the final call charges, updates the home subscriber line with these final charges, releases all reserve balances for this call, and creates a CDR. The process then proceeds to step 6410 at which the routine ends.

If, at step 6360, it is determined that the call disconnect routine has not been invoked, the process proceeds to step 6380 at which a determination is made whether the call has ended. If not, the process returns to step 6310. If the call has ended, a determination is made at step 6390 whether the Origin CO switch is the same as the Home CO switch. If so, the process proceeds to step 6405. If, at step 6390, the Origin CO switch is not the same as the Home CO switch, the process proceeds to step 6415 at which the Origin CO switch disconnects the call and updates the Origin Apps.CPU with the call termination time. Then, at step 6425, the Origin CO Apps.CPU finalizes the VSUB record with the final call charges, creates a CDR, and sends to the NAP 305 a call record report concerning the total charges used. Then, at step 6435, the Origin CO Apps.CPU sends the call record to an internal or external storage device. The call record is stored at step 6440.

Next, at step 6450, the NAP 305 sends to the Home CO switch the VSUB call record as received from the Origin CO switch. At step 6460, the Home CO switch applies the VSUB record to the home subscriber line, releases all reserve balances for this call to the home subscriber record, and creates a CDR.

From step 6460, a determination at step 6299 that the Origin CO switch is the same as the Home CO switch, or step 6303, the process proceeds to step 6470 at which it ends.

Figure 7:
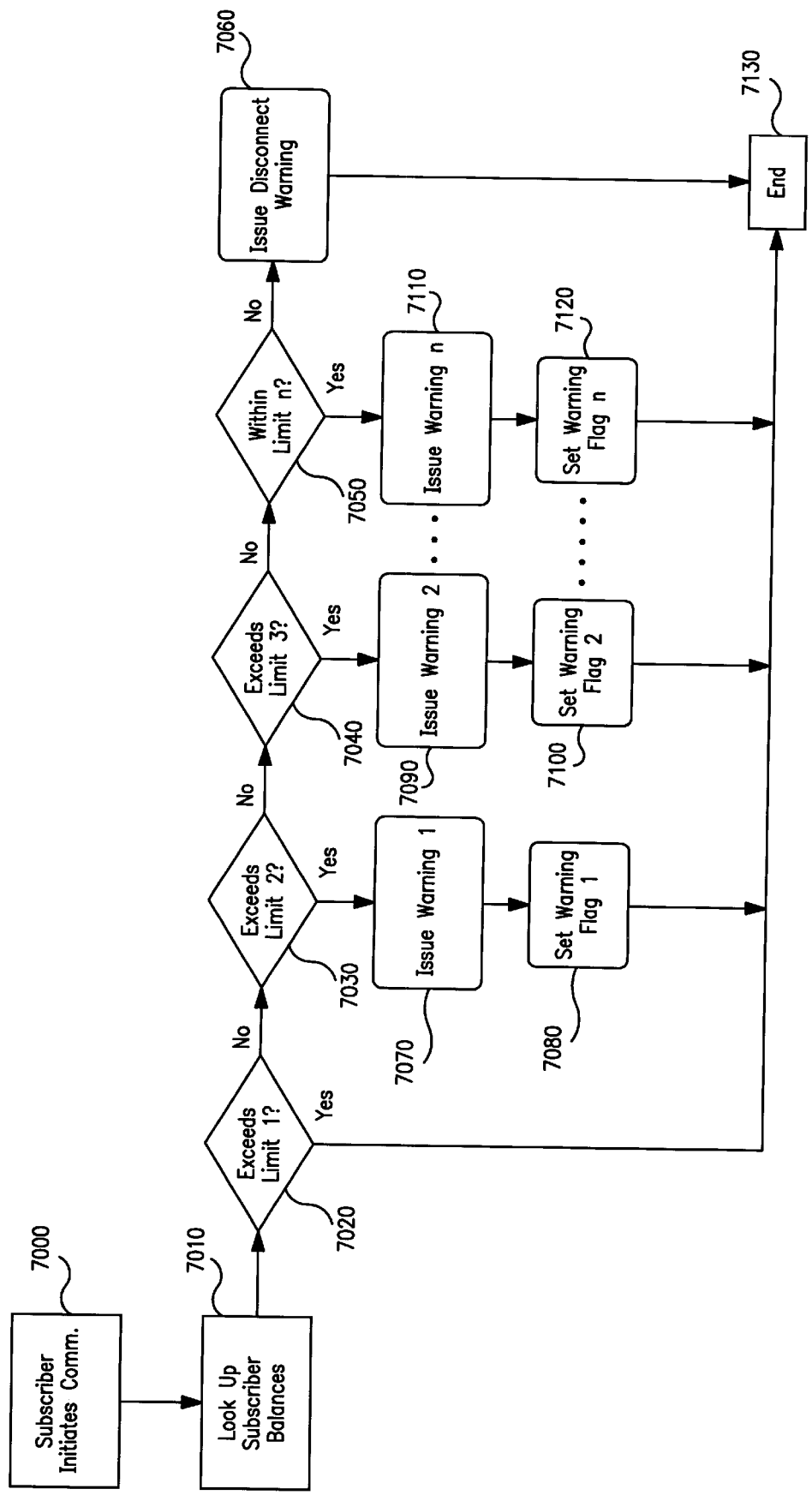
FIG. 7 illustrates an exemplary routine for initiating a communications warning message according to the present invention.

FIG. 7 illustrates an exemplary routine for initiating a communications warning message according to the present invention. Referring to FIG. 7, the Communications Warning Message Routine (CWMR) for initiating a warning message begins at step 7000, with the subscriber initiating a new communication by, for example, lifting the telephone handset to place a call. Next, at step 7010, the subscriber's balance, including for example the PUL/SUL and/or PUC/SUC, is looked up. At step 7020, the subscriber balance is compared with a predetermined first limit to determine if the balance exceeds the first limit. If not, the routine proceeds to step 7030, at which the subscriber's balance is compared with a predetermined second limit to determine if it exceeds the second limit. If not, the routine proceeds to step 7040, at which the subscriber's balance is compared with a predetermined third limit to determine if the balance exceeds the third limit. If not, the routine continues comparing the subscriber's balance with a series of predetermined limits up to step 7050 at which the subscriber's balance is compared with a predetermined nth limit, the last of a series of predetermined limits, to determine if the balance is within the nth limit. If the balance is not within the nth limit, the routine proceeds to step 7060 at which a disconnect warning is issued to the subscriber, indicating that the subscriber does not have a sufficient balance to establish a new communication. The routine then ends at step 7130.

If, at step 7030, it is determined that the subscriber's balance exceeds the second limit, a first warning is issued to the subscriber at step 7070. A first warning flag is then set at step 7080 so that the first warning message is not reissued during the communication. If, at step 7040, it is determined that the subscriber's balance exceeds the third limit, a second warning is issued to the subscriber at step 7090. A second warning flag is then set at step 7100 so that the second warning message is not reissued during the communication. If, at step 7050, it is determined that the subscriber's balance exceeds the nth, a nth−1 warning is issued to the subscriber at step 7110. An nth−1 warning flag is then set at step 7120 so that the nth−1 warning message is not reissued during the communication.

If, at step 7020, it is determined that the subscriber's balance exceeds the first limit, or from steps 7060, 7080, 7100, or 7120, the routine proceeds to step 7130 at which it ends.

Figure 8:
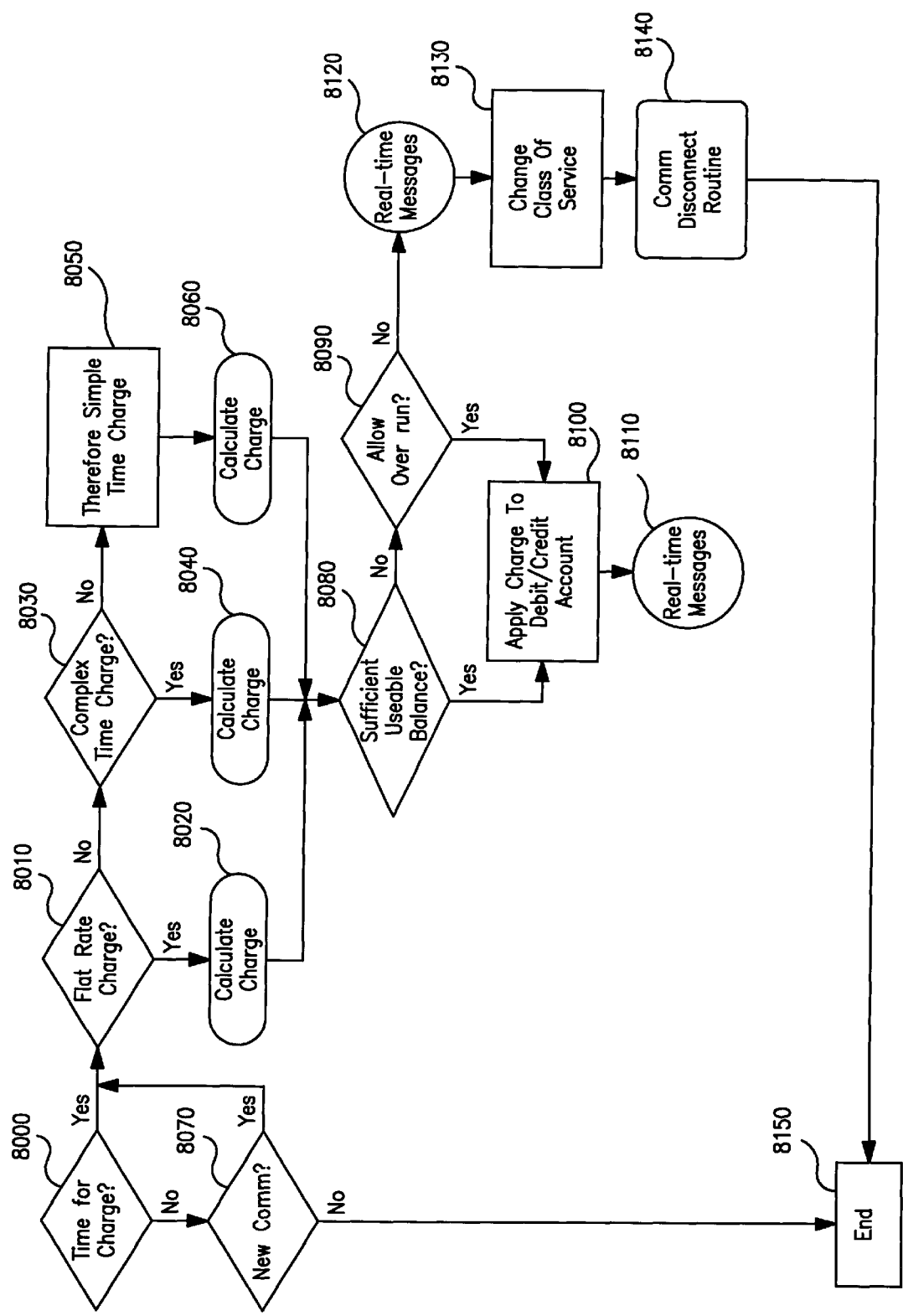
FIG. 8 illustrates an exemplary real time charge routine according to the present invention.

FIG. 8 illustrates an exemplary real time charge routine according to the present invention. Referring to FIG. 8, the Real Time Charge Routine (RTCR) starts at step 8000, at which it is determined if it is an appropriate time for a charge to be accumulated against a subscriber's balance. The appropriate time for the charge to be accumulated can be prior to, during, or after a communication is completed, depending, for example, on a prearranged agreement between the service provider and the subscriber. If at step 8000 it is determined that it is an appropriate time to accumulate a charge, a determination is made at step 8010 whether the communication is a flat rate communication, that is a communication with a single rate. An example of a flat rate communication is a local telephone call that is charged a flat rate of $0.50. If the communication is a flat rate communication, the flat rate charge is calculated at step 8020.

If the communication is determined at step 8010 not to be a flat rate communication, a determination is made at step 8030 whether a complex charge is to be calculated for the communication. For example, a call may be charged $1.00 for the first three minutes and then $0.50 cents for every minute thereafter in the case of a voice channel. For a data connection, there may be a $2.00 charge plus a $0.10 charge for every megabyte transferred. There may also be different charges for upstream and downstream data transmissions. If a complex charge is to be calculated, this calculation is performed at step 8040.

If it is determined at step 8030 that there is no complex charge to be calculated, the conclusion is made at step 8050 that a simple charge is to be calculated for the call, for example, $0.10 a minute, $0.01 per kilobit per minute capacity, $0.15 per megabyte throughput, etc. The simple charge is then calculated at step 8060.

If, at step 8000, it is determined that it is not an appropriate time for a charge, a determination is made at step 8070 whether the communication is new or ongoing. If the communication is new, the routine returns to step 8010.

Once the flat, complex, or simple charges are calculated at steps 8010, 8040, and 8060, a determination is made at step 8080 whether there is a sufficient usable balance in the subscriber's account for the call. If there is not a sufficient balance, a determination is made at step 8090 whether or not to allow over run of the balance, i.e., to exceed the balance.

If at step 8080 it is determined that there is a sufficient balance in the subscriber's account or at step 8090 it is determined to allow over run, a charge is applied to the debit or credit account at step 8100. From there, the routine proceeds to step 8110 which invokes the RTWMR described with reference to FIG. 9.

If, at step 8090, it is determined that an overrun should not be allowed, the routine proceeds to step 8120 at which the RTWMR is invoked. Next, the COS routine is performed at step 8130, described in detail with reference to FIG. 10, and a communication disconnect routine is performed at step 8140 to disconnect the communication. From a determination at step 8070 that the communication is not new or from step 8140, the routine proceeds to step 8150, where it ends.

Figure 9:
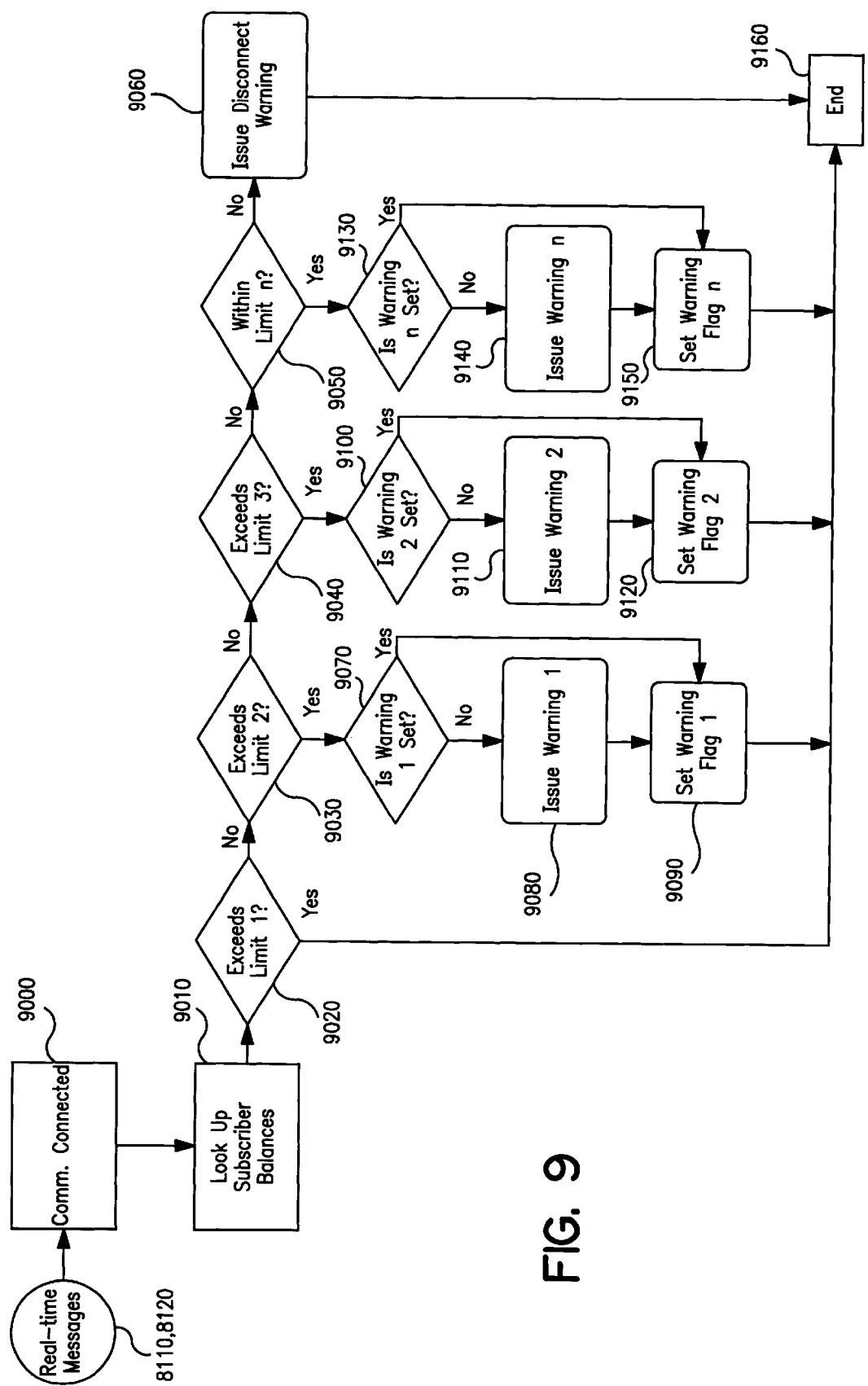
FIG. 9 illustrates an exemplary real time warning message routine according to the present invention.

FIG. 9 illustrates an exemplary real time warning message routine according to the present invention. Referring to FIG. 9, the Real Time Warning Message Routine (RTWMR) is invoked at step 8110 or step 8120 shown in FIG. 8. The RTWMR begins at step 9000 at which the subscriber starts a new communication by, for example, lifting the telephone handset to place a call. Next, at step 9010, the subscriber's balance is looked up. At step 9020, the subscriber's balance is compared with a predetermined first limit to determine if the balance exceeds the first limit. If not, the routine proceeds to step 9030 at which the subscriber's balance is compared with a predetermined second limit to determine if it exceeds the second limit. If not, the routine proceeds to step 9040 at which the subscriber's balance is compared with a predetermined third limit to determined if the balance exceeds the third limit. If not, the routine continues comparing the subscriber's balance with predetermined limits up until step 9050 at which the subscriber's balance is compared with a predetermined nth limit, the last of a series of predetermined limits, to determine if the balance is within that limit. If the subscriber's balance is not within the nth limit, the routine proceeds to step 9060 at which a disconnect warning is issued.

If, at step 9030, the second limit is exceeded, the process proceeds to step 9070 at which a determination is made whether a first warning flag is set. If the first warning flag is not set, the routine proceeds to step 9080 at which a first warning message is issued. Next, the routine proceeds to step 9090 at which the first warning flag is set.

If, at step 9040, the third limit is exceeded, the routine proceeds to step 9100 at which a determination is whether a second warning flag is set. If the second warning flag is not set, the routine proceeds to step 9110 at which a second warning message is issued. Next, at step 9120, the second warning flag is set.

If, at step 9050, the subscriber's balance is determined to be within the nth limit, the routine proceeds to step 9130 at which a determination is made whether the nth−1 warning flag is set. If not, the routine proceeds to step 9140 at which an nth warning message is issued. Next, at step 9150, the nth−1 warning flag is set.

If, at step 9020, it is determined that the subscriber's balance exceeds the first limit, or from steps 9060, 9090, 9120, or 9150, the routine proceeds to step 9160 at which it ends.

Figure 10:
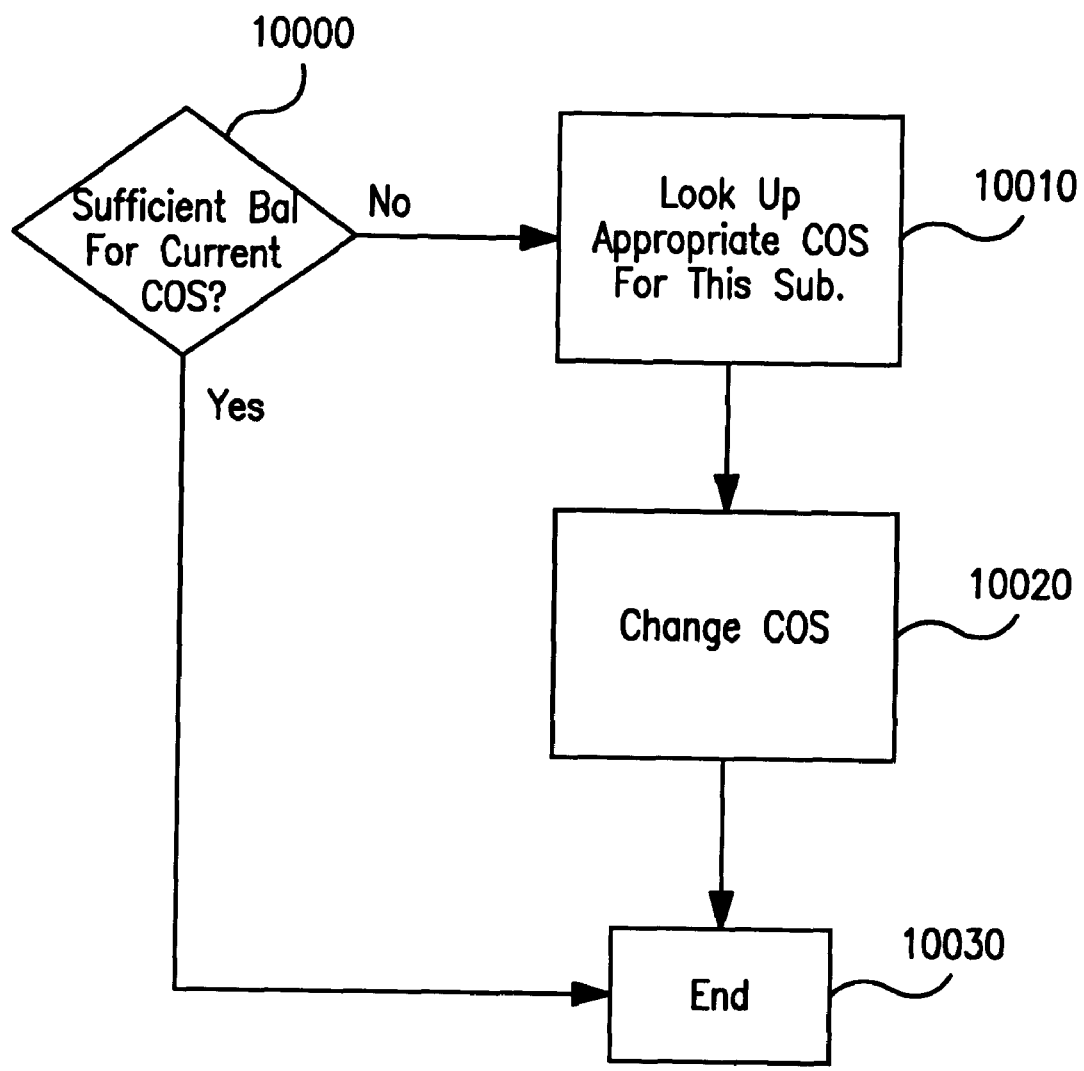
FIG. 10 illustrates an exemplary change of service routine according to the present invention.

FIG. 10 illustrates an exemplary change of service routine according to the present invention. The change of service (COS) routine can be invoked, for example, at step 8130 in FIG. 8. Referring to FIG. 10, the routine begins at step 10000 at which it is determined whether the subscriber has a sufficient balance for the current COS. If not, the appropriate COS authorized for the subscriber's usable balance is looked up at step 10010. For example, the COS authorized for particular subscriber balances for the subscriber can be looked up. Next, at step 10020, the COS is changed to the authorized COS. From step 10020 or a determination at step 10000 that the subscriber has sufficient balance for the current COS, the routine ends at step 10030.

In addition to the various features of the real time billing system described above, there are additional features which can be provided by the real time subscriber billing system. For example, there can also be a phone lock feature, in which the subscriber can alter the COS from a telephone by, for example, pressing a predetermined sequence of keys on the telephone pad including identifying information such as a PIN. This phone lock feature establishes a COS selected by the subscriber until a new COS is selected by the subscriber using the same method. For example, the subscriber can select a COS in which a telephone is limited to dialing local calls unless a PIN is keyed in before or after the dialed number.

Another feature provided by the real time subscriber billing system according to the present invention is electronic funds transfer. Using this feature, the subscriber can authorize the telephone company to electronically transfer funds from a bank account or a credit card account to replenish the subscriber's balance on a regular basis.

Another feature provided by the real time subscriber billing system according to the present invention is the payment for purchases which are ordered by phone. The subscriber's credit card numbers, names, addresses, and other pertinent credit information can be stored in the real time billing system to simplify use of the phone as an order entry device. To use this feature, the subscriber places a call to purchase a product or a service. After identifying the product or service, the subscriber releases the appropriate credit card number and other pertinent information by pressing a predetermined sequence of keys on the telephone pad, including the PIN. The subscriber can pay at his or her convenience and need not make any payment as long as the subscriber's balance is positive. The subscriber can be notified monthly or at other regular intervals as to how much must be paid to reestablish the original subscriber's balance. The subscriber can increase his or her balance at any time.

The real time subscriber billing system can also be the basis of a credit/debit card charging system. That is, a subscriber can charge products or services, such as power, gas, water, etc., to his or her prepaid deposit or credit limit. For regular charges such as utility services, the billing can be automatically charged to the subscriber's account and paid to the utility company by the telephone company. For other purchases, each transaction can be approved by the subscriber and can be computed only if the subscriber's balance is not exceeded.

The procedures for charging the subscriber's account can be similar to those described above for calling from a remote telephone. In addition, the subscriber can arrange for the increase of deposits or the payment of the account by any third party.

According to another aspect of the present invention, a Lineless Telephone Number (LTN) is provided. A subscriber who places a deposit or is granted a credit limit can be assigned a telephone number without requiring the subscriber to have a physical telephone line. The number can be answered by a prerecorded voice. A subscriber can retrieve messages on his or her LTN and can leave messages for all callers or for specific callers. This service can be particularly useful for subscribers that cannot afford a private phone or pager. Subscribers can also use the LTNs to place calls. When calls are placed from the home switch or from a remote telephone, billing can be processed and managed as previously described for regular subscribers placing such calls.

The embodiments above have been described with reference to a telephone network. However, it should be understood that the invention is also applicable to other types of subscriber systems, such as the Internet, cable television networks, and utilities such as gas and water.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A system for real time subscriber billing in a standard network routing path, comprising:
    means for storing account information for at least one subscriber, the account information including information regarding the subscriber's usable balance, wherein the usable balance is at least in part established by a system operator based on a credit limit established and verified by the system operator for the subscriber;
    means for determining, based on said account information, whether the subscriber has a sufficient balance for a desired service; and
    means for authorizing or denying service to the subscriber based on the determination, wherein at least one of the means for storing, the means for determining, and the means for authorizing or denying service is located outside a subscriber location, within the standard network routing path, in a central office switch.

2. The system of claim 1, wherein said account information is transmitted to and received from an external business management system at regular intervals or in real time, and said service can be disabled based on account information received from said external business management system.

3. The system of claim 1, wherein the authorizing means authorizes one of various classes of service based on the determination of whether the subscriber has a sufficient balance.

4. The system of claim 1, wherein the usable balance is automatically identified upon the subscriber accessing the system.

5. The system of claim 1, wherein the usable balance is represented in local currency values.

6. The system of claim 1, wherein the usable balance is represented by a Pulse Use Limit and a Pulse Use Credit.

7. The system of claim 1, wherein the credit limit established for the subscriber at least in part based on a deposit paid by the subscriber.

8. The system of claim 1, wherein the authorizing means authorizes one of various classes of service when usage reaches a certain level during a given period.

9. The system of claim 8, wherein one of various classes of service includes discounts applied to the subscriber billing rates.

10. The system of claim 1, wherein the desired service is a communication session.

11. The system of claim 10, wherein at least one of said storing means, said determining means, and said authorizing means is located outside the subscriber location, in a channel billing monitor in said standard network routing path or in a data processor connected to said channel billing monitor.

12. The system of claim 10, wherein at least one of said storing means, said determining means, and said authorizing means is located outside the subscriber location, in a network routing device in said standard network routing path or in a data processor connected to said network routing device.

13. The system of claim 10, wherein at least one of said storing means, said determining means, and said authorizing means is located at a subscriber location in said standard network routing path or in a data processor connected to said subscriber location.

14. The system of claim 10, wherein the communication session is a telephone call, an Internet session, or a pay-per-view television program.

15. The system of claim 1, wherein said determining means repeats said determination during said service.

16. The system of claim 15, further comprising:
    means for detecting cost signals generated at predetermined intervals or an amount of time elapsed during the service;
    means for counting a number of cost signals generated or the amount of time elapsed; and
    means for comparing the count with a predetermined threshold, wherein the determining means bases the determination on said comparison.

17. The system of claim 16, further comprising means for warning the subscriber when the count approaches the threshold.

18. A method for real time subscriber billing in a standard network routing path, the method comprising the steps of:
    storing account information for at least one subscriber, the account information including information regarding the subscriber's usable balance, wherein the usable balance is at least in part established by a system operator based on a credit limit established and verified by the system operator for the subscriber;
    determining, based on said account information, whether the subscriber has a sufficient balance for a desired service; and
    authorizing or denying service to the subscriber based on the determination, wherein at least one of the steps of storing, determining, and authorizing or denying service is performed outside a subscriber location, within the standard network routing path, in a central office switch.

19. The method of claim 18, further comprising:
    transmitting said account information to an external business management system; and
    receiving account information from said external business management system, wherein said steps of transmitting and receiving can be performed at regular intervals or in real time, and said service can be disabled based on said account information received from said external business management system.

20. The method of claim 18, wherein the step of authorizing authorizes one of various classes of service based on the determination of whether the subscriber has a sufficient balance.

21. The method of claim 18, wherein the usable balance is automatically identified upon the subscriber accessing the system.

22. The method of claim 18, wherein the usable balance is represented in local currency values.

23. The method of claim 18, wherein the usable balance is represented by a Pulse Use Limit and a Pulse Use Credit.

24. The method of claim 18, wherein the credit limit established for the subscriber at least in part based on a deposit paid by the subscriber.

25. The method of claim 18, wherein the authorizing means authorizes one of various classes of service when usage reaches a certain level during a given period.

26. The method of claim 25, wherein one of various classes of service includes discounts applied to the subscriber billing rates.

27. The method of claim 18, wherein the desired service is a communication session.

28. The method of claim 27, wherein at least one of said steps of storing, determining, and authorizing is performed outside the subscriber location, in a channel billing monitor in said standard network routing path or in a data processor connected to said channel billing monitor.

29. The method of claim 27, wherein at least one of said steps of storing, determining, and authorizing is performed outside the subscriber location, in a network routing device in said standard network routing path or in a data processor connected to said network routing device.

30. The method of claim 27, wherein at least one of said steps of storing, determining, and authorizing is performed at a subscriber location in the standard network routing path or in a data processor connected to said subscriber location.

31. The method of claim 27, wherein the communication session is a telephone call, an Internet session, or a pay-per-view television program.

32. The method of claim 18, wherein said step of determining is repeated during the service.

33. The method of claim 32, further comprising:

detecting cost signals generated at predetermined intervals or an amount of time elapsed during the service;

counting the number of cost signals of the amount of time elapsed; and comparing the count with a predetermined threshold, wherein the step of determining bases the determination on said comparison.

34. The method of claim 33, further comprising warning the subscriber when the count approaches the threshold.

* * * * *